(12) United States Patent
Fan et al.

(10) Patent No.: US 12,401,454 B2
(45) Date of Patent: Aug. 26, 2025

(54) RADIO LINK CONTROL STATUS REPORT METHOD AND CORRESPONDING APPARATUS

(71) Applicant: HUAWEI TECHNOLOGIES CO., LTD., Guangdong (CN)

(72) Inventors: Qiang Fan, Shanghai (CN); Chong Lou, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 351 days.

(21) Appl. No.: 17/991,280

(22) Filed: Nov. 21, 2022

(65) Prior Publication Data

US 2023/0090249 A1 Mar. 23, 2023

Related U.S. Application Data

(63) Continuation of application No. PCT/CN2021/093516, filed on May 13, 2021.

(30) Foreign Application Priority Data

May 21, 2020 (CN) .......................... 202010437538.4

(51) Int. Cl.
*H04W 72/04* (2023.01)
*H04L 1/1607* (2023.01)
(Continued)

(52) U.S. Cl.
CPC .......... *H04L 1/1621* (2013.01); *H04L 5/0055* (2013.01); *H04W 28/04* (2013.01); *H04W 80/02* (2013.01)

(58) Field of Classification Search
CPC .... H04L 1/1621; H04L 5/0055; H04W 28/04; H04W 28/0278; H04W 80/02
See application file for complete search history.

(56) References Cited

U.S. PATENT DOCUMENTS

2009/0203374 A1* 8/2009 Chun .................... H04L 1/1628
455/425
2009/0268683 A1* 10/2009 Ho ........................ H04L 1/1628
370/329

(Continued)

FOREIGN PATENT DOCUMENTS

CN 101931516 A 12/2010
CN 106134099 A 11/2016
(Continued)

OTHER PUBLICATIONS

Huawei et al., "Further consideration on RLC status PDU format," 3GPP TSG-RAN WG2 #99, R2-1707729, Berlin, Germany, Aug. 21-25, 2017, 7 pages.

(Continued)

*Primary Examiner* — Mahbubul Bar Chowdhury
(74) *Attorney, Agent, or Firm* — Fish & Richardson P.C.

(57) ABSTRACT

This application provides a method and a corresponding apparatus. One example method includes: A transmitting side receives an RLC status report from a receiving side, where the RLC status report includes at least one piece of status information, each of the at least one piece of status information indicates one or more receiving statuses of one or more consecutive RLC service data units (SDUs) that are not successfully received, and the at least one piece of status information is sequentially sorted in ascending order of RLC SDU sequence numbers (SNs) in the RLC status report; and if the last piece of status information in the RLC status report indicates that a part of data of a first RLC SDU is lost, the transmitting side determines, based on the RLC status report, whether a receiving status of the first RLC SDU is completely reflected in the RLC status report.

18 Claims, 12 Drawing Sheets

(51) Int. Cl.
  *H04L 5/00* (2006.01)
  *H04W 28/04* (2009.01)
  *H04W 80/02* (2009.01)

(56) References Cited

U.S. PATENT DOCUMENTS

| | | | | |
|---|---|---|---|---|
| 2010/0097936 | A1* | 4/2010 | Lee | H04L 1/1607 370/241 |
| 2010/0105334 | A1* | 4/2010 | Terry | H04L 1/1854 455/67.11 |
| 2011/0041024 | A1 | 2/2011 | Burbidge et al. | |
| 2018/0316619 | A1 | 11/2018 | Hong et al. | |
| 2019/0052409 | A1* | 2/2019 | Kainulainen | H04L 1/1621 |
| 2020/0229111 | A1* | 7/2020 | Kim | H04B 7/0695 |
| 2021/0211924 | A1* | 7/2021 | Pan | H04W 28/0268 |
| 2021/0314810 | A1* | 10/2021 | Kanamarlapudi | H04L 1/1671 |

FOREIGN PATENT DOCUMENTS

| | | | |
|---|---|---|---|
| CN | 108809526 A | 11/2018 | |
| CN | 108809528 A | 11/2018 | |
| WO | 2016069139 A1 | 5/2016 | |
| WO | 2018199655 A1 | 11/2018 | |
| WO | WO-2018201960 A1 * | 11/2018 | ........... H04L 1/1607 |

OTHER PUBLICATIONS

Extended European Search Report in European Appln No. 21808531.4, dated Sep. 21, 2023, 11 pages.

Huawei et al., "Discussion on Missing RLC Segment in RLC Status PDU," 3GPP TSG-RAN WG2 Meeting #110-e, R2-2005471, Jun. 1-12, 2020, 2 pages.

3GPP TS 38.322 V16.0.0, "3rd Generation Partnership Project; Technical Specification Group Radio Access Network; NR; Radio Link Control (RLC) Protocol Specification (Release 16)," Mar. 2020, 33 pages.

International Search Report and Written Opinion in International Appln. No. PCT/CN2021/093516, mailed on Aug. 13, 2021, 18 pages (with English translation).

* cited by examiner

| | | | | | | | | |
|---|---|---|---|---|---|---|---|---|

| D/C = 0 | CPT = 0 | ACK_SN |
|---|---|---|
| ACK_SN = 71 |||
| E1 = 0 | R | R | R | R | R | R | R |
| NACK_SN |
| NACK_SN = 1 | E1 = 0 | E2 = 0 | E3 = 0 | R |
| NACK_SN |
| NACK_SN = 18 | E1 = 1 | E2 = 1 | E3 = 0 | R |
| SOstart |
| SOstart = offset 1 |
| SOend |
| SOend = offset 2 |
| NACK_SN |
| NACK_SN = 20 | E1 = 1 | E2 = 0 | E3 = 1 | R |
| NACK range = 3 |
| NACK_SN |
| NACK_SN = 30 | E1 = 0 | E2 = 1 | E3 = 1 | R |
| SOstart |
| SOstart = offset 3 |
| SOend |
| SOend = offset 4 |
| NACK range = 3 |

SOstart: Segment offset start location
SOend: Segment offset end location
NACK range: Negative acknowledgment range

FIG. 2B

Segment offset start location SOstart = 0
Segment offset end location SOend = X

RADIO LINK CONTROL STATUS REPORT METHOD AND CORRESPONDING APPARATUS

CROSS-REFERENCE TO RELATED APPLICATION

This application is a continuation of International Application No. PCT/CN2021/093516, filed on May 13, 2021, which claims priority to Chinese Patent Application No. 202010437538.4, filed on May 21, 2020. The disclosures of the aforementioned applications are hereby incorporated by reference in their entireties.

TECHNICAL FIELD

This application relates to the field of communication technologies, and in particular, to a method for receiving a radio link control (RLC) status report and a corresponding apparatus.

BACKGROUND

To improve reliability of service transmission and avoid a data loss as much as possible, an RLC layer in a new radio (NR) user plane protocol stack provides a transmission mode: an acknowledge mode (AM). Main content of the AM mode is as follows: After receiving data, an AM RLC entity on a receiving side may send an RLC status report to a transmitting side, to indicate a data packet that is successfully received and a data packet that fails to be received, so that an AM RLC entity on the transmitting side may retransmit, based on the RLC status report, the data packet that fails to be transmitted.

When filling in the RLC status report, the receiving side sequentially indicates, in ascending order of sequence numbers (SNs), information about one or more RLC SDUs that are not successfully received, until available space of the RLC status report is filled. Therefore, the following case exists: When filling information about the last RLC SDU that is not successfully received, the receiving side can fill only a part of the information about the last RLC SDU that is not successfully received because the available space of the RLC status report is limited, and other remaining information cannot be filled in the RLC status report. However, the transmitting side does not know whether the information about the last RLC SDU that is not successfully received and that is indicated in the RLC status report is complete, and further incorrectly considers that another data part of the last RLC SDU that is not successfully received is already successfully received and the another data is not reflected in the RLC status report, and clears, from a buffer, the data part that is considered to be successfully received. Consequently, data that is actually not successfully transmitted is lost.

SUMMARY

Embodiments of this application provide a communication method and a device, to improve reliability of data transmission.

According to a first aspect, a radio link control RLC status report method is provided, including:

A transmitting side receives an RLC status report from a receiving side. The RLC status report includes at least one piece of status information, each of the at least one piece of status information indicates one or more receiving statuses of one or more consecutive RLC service data units SDUs that are not successfully received, and the at least one piece of status information is sequentially sorted in ascending order of RLC SDU sequence numbers SNs in the RLC status report. If the last piece of status information in the RLC status report indicates that a part of data of a first RLC SDU is lost, the transmitting side determines, based on the RLC status report, whether a receiving status of the first RLC SDU is completely reflected in the RLC status report.

In this implementation, when determining that the last piece of status information in the RLC status report indicates that the part of data of the first RLC SDU is lost, the transmitting side determines, based on the RLC status report, whether the receiving status of the first RLC SDU is completely reflected in the RLC status report, instead of directly considering that all data that is of the first RLC SDU and that is not reflected in the status report is successfully received. This can improve reliability of the RLC status report, and further avoid a problem that data that is actually not successfully transmitted is lost.

Optionally, that the transmitting side determines, based on the RLC status report, whether a receiving status of the first RLC SDU is completely reflected in the RLC status report includes: If the last piece of status information finally indicates that an RLC SDU segment in the first RLC SDU is lost, the transmitting side determines that the receiving status of the first RLC SDU is not completely reflected in the RLC status report.

In this implementation, if the last piece of status information in the RLC status report finally indicates that the RLC SDU segment in the first RLC SDU is lost, the transmitting side determines that the receiving status of the first RLC SDU is not completely reflected in the RLC status report, instead of directly considering that all data that is of the first RLC SDU and that is not reflected in the status report is successfully received. This can improve reliability of the RLC status report, and further avoid a problem that data that is actually not successfully transmitted is lost.

Optionally, the RLC status report further includes first indication information, and the first indication information indicates whether the receiving status of the first RLC SDU is completely reflected in the RLC status report. That the transmitting side determines, based on the RLC status report, whether a receiving status of the first RLC SDU is completely reflected in the RLC status report includes: The transmitting side determines, based on the first indication information, whether the receiving status of the first RLC SDU is completely reflected in the RLC status report.

In this implementation, the transmitting side determines, based on the first indication information in the RLC status report, whether the receiving status of the first RLC SDU is completely reflected in the RLC status report, instead of directly considering that all data that is of the first RLC SDU and that is not reflected in the status report is successfully received. This can improve reliability of the RLC status report, and further avoid a problem that data that is actually not successfully transmitted is lost.

Optionally, that the transmitting side, based on the RLC status report, whether a receiving status of the first RLC SDU is completely reflected in the RLC status report includes: If acknowledgment_sequence number ACK_SN in the RLC status report is the same as an SN of the first RLC SDU, the transmitting side determines that the receiving status of the first RLC SDU is not completely reflected in the RLC status report.

In this implementation, the transmitting side determines, based on ACK_SN in the RLC status report, whether the receiving status of the first RLC SDU is completely reflected in the RLC status report, instead of directly considering that all data that is of the first RLC SDU and that is not reflected in the status report is successfully received. This can improve reliability of the RLC status report, and further avoid a problem that data that is actually not successfully transmitted is lost.

Optionally, that the transmitting side determines, based on the RLC status report, whether a receiving status of the first RLC SDU is completely reflected in the RLC status report includes: If the last piece of status information finally indicates that an RLC SDU segment in the first RLC SDU is lost, and data that is of the first RLC SDU and that follows the RLC SDU segment is encapsulated into a plurality of RLC protocol data units PDUs during transmission, the transmitting side determines that the receiving status of the first RLC SDU is not completely reflected in the RLC status report.

In this implementation, if the last piece of status information in the RLC status report finally indicates that the RLC SDU segment in the first RLC SDU is lost, the transmitting side further determines, based on an encapsulation status of data that is of the first RLC SDU and that follows the RLC SDU segment during transmission (that is, whether the data is encapsulated into the plurality of RLC protocol data units PDUs), whether the receiving status of the first RLC SDU is completely reflected in the RLC status report, instead of directly considering that all data that is of the first RLC SDU and that is not reflected in the status report is successfully received. This can improve reliability of the RLC status report, and further avoid a problem that data that is actually not successfully transmitted is lost.

Optionally, if the receiving status of the first RLC SDU is not completely reflected in the RLC status report, the method further includes: The transmitting side retransmits data that is of the first RLC SDU and whose receiving status is not reflected in the RLC status report; the transmitting side retransmits all data of the first RLC SDU; the transmitting side stores, in a buffer, data that is of the first RLC SDU and whose receiving status is not reflected in the RLC status report; or the transmitting side stores all data of the first RLC SDU in a buffer.

In this implementation, to avoid that data that is actually not successfully transmitted is lost, the data that is not successfully transmitted is retransmitted or stored in the buffer. This can further improve reliability of data transmission.

According to a second aspect, a radio link control RLC status report method is provided, including: A receiving side fills at least one piece of status information in an RLC status report, where each of the at least one piece of status information indicates one or more receiving statuses of one or more consecutive RLC service data units SDUs that are not successfully received, and the at least one piece of status information is sequentially sorted in ascending order of RLC SDU sequence numbers SNs in the RLC status report; and the receiving side sends the RLC status report to a transmitting side.

In this implementation, the receiving side fills the at least one piece of status information in the RLC status report and then sends the RLC status report to the transmitting side, so that the transmitting side can learn a receiving status on the receiving side based on the RLC status report, to improve reliability of data transmission.

Optionally, the method further includes: When status information corresponding to a first RLC SDU in the at least one piece of status information indicates that a part of data of the first RLC SDU is lost and the status information corresponding to the first RLC SDU cannot be completely filled in the RLC status report, the receiving side skips filling, in the status report, the status information corresponding to the first RLC SDU, or the receiving side fills, in the RLC status report, status information indicating that all data of the first RLC SDU is lost.

In this implementation, a manner of filling the status information by the receiving side is constrained, so that if an RLC SDU segment is finally indicated in the generated RLC status report, a data part that follows the segment is definitely successfully received. This can improve reliability of the RLC status report, and avoid a problem that data that is actually not successfully transmitted is lost.

Optionally, the method further includes: When status information corresponding to a first RLC SDU in the at least one piece of status information indicates that a part of data of the first RLC SDU is lost and the status information corresponding to the first RLC SDU cannot be completely filled in the RLC status report, the receiving side fills first indication information in the RLC status report, where the first indication information indicates that a receiving status of the first RLC SDU is not completely reflected in the RLC status report.

In this implementation, the receiving side includes the first indication information in the RLC status report, so that after receiving the RLC status report, the transmitting side may determine, based on the first indication information, whether the receiving status of the first RLC SDU is completely reflected in the RLC status report, instead of directly considering that all data that is of the first RLC SDU and that is not reflected in the status report is successfully received. This can improve reliability of the RLC status report, and further avoid a problem that data that is actually not successfully transmitted is lost.

Optionally, the method further includes: when the status information corresponding to the first RLC SDU in the at least one piece of status information indicates that the data of the first RLC SDU is lost and the status information corresponding to the first RLC SDU cannot be completely filled in the RLC status report, setting acknowledgment_sequence number ACK_SN in the RLC status report to an SN of the first RLC SDU.

In this implementation, the receiving side sets ACK_SN to the SN of the first RLC SDU in the RLC status report, so that after receiving the RLC status report, the transmitting side may determine, based on ACK_SN, whether the receiving status of the first RLC SDU is completely reflected in the RLC status report, instead of directly considering that all data that is of the first RLC SDU and that is not reflected in the status report is successfully received. This can improve reliability of the RLC status report, and further avoid a problem that data that is actually not successfully transmitted is lost.

Optionally, if the receiving status of the first RLC SDU is not completely reflected in the RLC status report, the method further includes: The receiving side receives data that is of the first RLC SDU, that is retransmitted by the transmitting side, and whose receiving status is not reflected in the RLC status report; or the receiving side receives that is all data of the first RLC SDU and that is retransmitted by the transmitting side.

In this implementation, the receiving side may re-receive the data that is not successfully transmitted, so that reliability of data transmission can be further improved.

According to a third aspect, a communication apparatus is provided. The apparatus may be a network device, an apparatus on the network device, a terminal device, or an apparatus on the terminal device. The apparatus includes modules configured to perform the method in any one of the first aspect or the possible designs of the first aspect.

For example, the apparatus may include:
- a receiving module, configured to receive an RLC status report from a receiving side, where the RLC status report includes at least one piece of status information, each of the at least one piece of status information indicates one or more receiving statuses of one or more consecutive RLC service data units SDUs that are not successfully received, and the at least one piece of status information is sequentially sorted in ascending order of RLC SDU sequence numbers SNs in the RLC status report; and
- a processing module, configured to: if the last piece of status information in the RLC status report indicates that a part of data of a first RLC SDU is lost, determine, based on the RLC status report, whether a receiving status of the first RLC SDU is completely reflected in the RLC status report.

Optionally, the processing module is specifically configured to:
- if the last piece of status information finally indicates that an RLC SDU segment in the first RLC SDU is lost, determine that the receiving status of the first RLC SDU is not completely reflected in the RLC status report.

Optionally, the RLC status report further includes first indication information, and the first indication information indicates whether the receiving status of the first RLC SDU is completely reflected in the RLC status report.

The processing module is specifically configured to determine, based on the first indication information, whether the receiving status of the first RLC SDU is completely reflected in the RLC status report.

Optionally, the processing module is specifically configured to: if acknowledgment_sequence number ACK_SN in the RLC status report is the same as an SN of the first RLC SDU, determine that the receiving status of the first RLC SDU is not completely reflected in the RLC status report.

Optionally, the processing module is specifically configured to: if the last piece of status information finally indicates that an RLC SDU segment in the first RLC SDU is lost, and data that is of the first RLC SDU and that follows the RLC SDU segment is encapsulated into a plurality of RLC protocol data units PDUs during transmission, determine that the receiving status of the first RLC SDU is not completely reflected in the RLC status report.

Optionally, if the receiving status of the first RLC SDU is not completely reflected in the RLC status report, the apparatus further includes:
- a sending module, configured to retransmit data that is of the first RLC SDU and whose receiving status is not reflected in the RLC status report, or retransmit all data of the first RLC SDU; or
- a storage module, configured to store, in a buffer, data that is of the first RLC SDU and whose receiving status is not reflected in the RLC status report, or store all data of the first RLC SDU in a buffer.

According to a fourth aspect, a communication apparatus is provided. The apparatus may be a network device, an apparatus on the network device, a terminal device, or an apparatus on the terminal device. The apparatus includes modules configured to perform the method in any one of the second aspect or the possible designs of the second aspect.

For example, the apparatus may include:
- a processing module, configured to fill at least one piece of status information in an RLC status report, where each of the at least one piece of status information indicates one or more receiving statuses of one or more consecutive RLC service data units SDUs that are not successfully received, and the at least one piece of status information is sequentially sorted in ascending order of RLC SDU sequence numbers SNs in the RLC status report; and
- a sending module, configured to send the RLC status report to a transmitting side.

Optionally, the processing module is further configured to:
- when status information corresponding to a first RLC SDU in the at least one piece of status information indicates that a part of data of the first RLC SDU is lost and the status information corresponding to the first RLC SDU cannot be completely filled in the RLC status report, skip filling, in the status report, the status information corresponding to the first RLC SDU, or fill, in the RLC status report, status information indicating that all data of the first RLC SDU is lost.

Optionally, the processing module is further configured to:
- when status information corresponding to a first RLC SDU in the at least one piece of status information indicates that a part of data of the first RLC SDU is lost and the status information corresponding to the first RLC SDU cannot be completely filled in the RLC status report, fill first indication information in the RLC status report, where the first indication information indicates that a receiving status of the first RLC SDU is not completely reflected in the RLC status report.

Optionally, the processing module is further configured to:
- when the status information corresponding to the first RLC SDU in the at least one piece of status information indicates that the part of data of the first RLC SDU is lost and the status information corresponding to the first RLC SDU cannot be completely filled in the RLC status report, set acknowledgment_sequence number ACK_SN in the RLC status report to an SN of the first RLC SDU.

Optionally, if the receiving status of the first RLC SDU is not completely reflected in the RLC status report, the apparatus further includes:
- a receiving module, configured to receive data that is of the first RLC SDU, that is retransmitted by the transmitting side, and whose receiving status is not reflected in the RLC status report, or configured to receive all data that is of the first RLC SDU and that is retransmitted by the transmitting side.

According to a fifth aspect, a communication apparatus is provided. The apparatus includes:
- at least one processor, and a communication interface that is communicatively connected to the at least one processor.

The at least one processor executes instructions stored in a memory, so that the apparatus performs the method according to any one of the first aspect or the optional implementations of the first aspect or any one of the second aspect or the optional implementations of the second aspect.

Optionally, the memory is located outside the apparatus.

Optionally, the apparatus includes the memory. The memory is connected to the at least one processor, and the memory stores the instructions that can be executed by the at least one processor.

According to a sixth aspect, a computer-readable storage medium is provided, including a program or instructions. When the program or the instructions is/are run on a computer, the method according to any one of the first aspect or the optional implementations of the first aspect or the second aspect or the optional implementations of the second aspect is performed.

According to a seventh aspect, a chip is provided. The chip is coupled to a memory, and is configured to read and execute program instructions stored in the memory, the method according to any one of the first aspect or the optional implementations of the first aspect or the second aspect or the optional implementations of the second aspect is performed.

According to an eighth aspect, a computer program product is provided, including instructions. When the instructions are run on a computer, the method according to any one of the first aspect or the optional implementations of the first aspect or the second aspect or the optional implementations of the second aspect is performed.

According to a ninth aspect, a communication apparatus is provided, including a processor and an interface circuit. The interface circuit is configured to receive a signal from another communication apparatus different from the communication apparatus and transmit the signal to the processor, or send a signal from the processor to the another communication apparatus different from the communication apparatus. The processor is configured to implement, by using a logic circuit or executing code instructions, the method according to any one of the first aspect or the optional implementations of the first aspect or the second aspect or the optional implementations of the second aspect.

According to a tenth aspect, a communication system is provided, including the apparatus according to any one of the third aspect or the optional implementations of the third aspect, and the apparatus according to any one of the fourth aspect or the optional implementations of the fourth aspect.

For beneficial effects of the implementations in the third aspect to the ninth aspect, refer to beneficial effects of the corresponding implementations in the first aspect and the second aspect. Details are not described herein again.

BRIEF DESCRIPTION OF DRAWINGS

FIG. 2A and FIG. 2B each are a schematic diagram of a format of an RLC status report;

DESCRIPTION OF EMBODIMENTS

Figure 1:
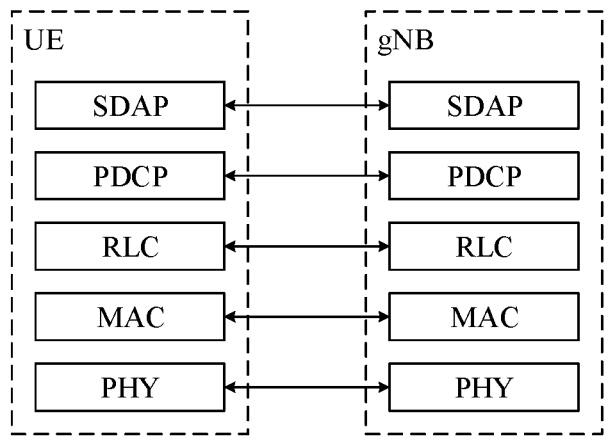
FIG. 1 is a schematic diagram of a new radio (NR) user plane protocol stack.

FIG. 1 is a schematic diagram of a new radio (NR) user plane protocol stack. As shown in FIG. 1, the NR user plane protocol stack includes a service data adaptation protocol (, SDAP) layer, a packet data convergence protocol (PDCP) layer, a radio link control (RLC) layer, a media access control layer (MAC), and a physical layer (PHY).

The RLC layer is located between the PDCP layer and the MAC layer. The RLC layer communicates with the PDCP layer by using a service access point (SAP) or an RLC channel, and communicates with the MAC layer by using a logical channel. Data transmitted between the RLC layer and the PDCP layer is referred to as an RLC service data unit SDU (SDU) or a PDCP protocol data unit (PDU). The RLC layer may perform operations such as segmentation, concatenation, reassembly, and re-segmentation on the RLC SDU.

An RLC entity may receive the RLC SDU from a lower layer (the MAC layer), and submit the RLC PDU to an upper layer (the PDCP layer or an RRC layer), or may receive the RLC PDU from the upper layer and submit the RLC SDU to the lower layer. The RLC PDU may be an RLC data PDU or an RLC control PDU. The RLC entity receives the RLC SDU from the upper layer by using the RLC channel between the RLC entity and the upper layer protocol layer entity, and forms the RLC data PDU. The RLC entity transfers the formed RLC data PDU to the MAC layer by using the logical channel between the RLC entity and the MAC layer for further processing. Correspondingly, the RLC entity may receive the RLC data PDU from the MAC layer by using the logical channel, and form the RLC SDU based on the RLC data PDU. The RLC entity delivers, by using the RLC channel, the formed RLC SDU to the upper layer entity for further processing. The RLC entity delivers the generated RLC PDU to the MAC layer only when the MAC layer indicates a transmit opportunity. A total size of one or more delivered RLC PDUs needs to match a data packet size indicated by the MAC layer. If the transmit opportunity size indicated by the MAC layer is not matched, the RLC SDU may be divided into a plurality of segments, and the segments form a plurality of RLC PDUs for transmission.

To meet quality of service (QoS) requirements of different types of service data, the RLC layer provides three transmission modes: a transparent mode (TM), an unacknowledged mode (UM), and an acknowledged mode (AM).

The TM mode is used to transmit data, paging data, and a broadcast system message of signaling radio bearer (SRB) 0. In the TM mode, the RLC entity does not perform segmentation and concatenation for an RLC SDU of the type of message, but only transparently transmits the data.

The UM mode is usually used for a service that has a high requirement on a service latency but has a moderate requirement on reliability. Transmission of a data packet is considered complete after the data packet is transmitted by a UM RLC entity. Even if the data packet is lost during transmission over an air interface, the RLC layer does not retransmit the data packet.

The AM mode is usually used for a service that has a high requirement on service reliability. This type of service needs to avoid data loss during transmission as much as possible. An AM RLC entity uses an automatic repeat request (ARQ) mechanism, to ensure lossless data transmission. A basic idea of an ARQ is that a data receiving side (a receiving side for short) may send an RLC status report to a data transmitting side (a transmitting side for short), to indicate which data packet is successfully received and which data packet fails to be received, and the transmitting side may retransmit, based on the RLC status report, a data packet that fails to be transmitted.

The receiving side triggers the RLC status report when any one of the following conditions is satisfied:

(1) A reassembly timer (t-Reassembly) on the receiving side expires.

(2) An AM RLC entity on the receiving side receives an RLC PDU, and a status report sending request bit (Polling bit) in the RLC PDU is set to 1.

The polling bit is included in a packet header of the RLC PDU. If the polling bit=1, the RLC status report is requested. If the polling bit=0, the RLC status report is not requested. When the transmitting side sends the RLC PDU to the receiving side, the receiving side determines, based on a polling bit value in the packet header of the RLC PDU, whether the RLC status report needs to be sent to a transmitting end. For example, when the polling bit=1, the receiving side may trigger the sending of the RLC status report. For example, when the polling bit=0, the receiving side does not need to trigger the sending of the status report.

When an RLC status report is triggered and a status prohibit timer (t-StatusProhibit) is not running, if a MAC layer on the receiving side indicates a transmit opportunity to an RLC layer, the RLC layer generates an RLC status report, where the RLC status report may also be referred to as an RLC status PDU (RLC status PDU).

Specifically, starting from the $1^{st}$ RLC SDU that is not completely received in sequence, the AM RLC entity on the receiving side sequentially indicates, in ascending order of sequence numbers (SNs), information about an RLC SDU or an RLC SDU segment that is not successfully received, until a size (namely, available space of the RLC status report) of an RLC status PDU is filled, where the RLC status PDU can be generated and is indicated by the MAC layer.

In the RLC status report, manners of indicating the RLC SDU or the RLC SDU segment that is not successfully received include the following three manners:

(1) If the RLC SDU is not completely received, the RLC status report includes negative acknowledgment_sequence number NACK_SN whose value is an SN corresponding to the RLC SDU.

(2) If the RLC SDU segment is not received, in addition to NACK_SN, the RLC status report further includes a segment offset start location (SOstart) and a segment offset end location (SOend), where NACK_SN is a NACK_SN of the RLC SDU, SOstart is a relative location of the $1^{st}$ byte of the lost segment in the original RLC SDU, and SOend is a relative location of the last byte of the lost segment in the original RLC SDU. The $1^{st}$ byte of the original RLC SDU may be represented by using all zeros of a 2-byte length, and the last byte of the original RLC SDU may be represented by using all ones of a 2-byte length. It should be understood that if a plurality of segments in one RLC SDU are lost, each segment corresponds to a group of NACK_SN, SOstart, and SOend. For ease of descriptions, in the following embodiments, a group of NACK_SN, SOstart, and SOend corresponding to one RLC SDU segment may be represented by NACK_SN+SOstart+SOend.

(3) If a group of consecutive RLC SDUs are not received, the RLC status report includes NACK_SN and negative acknowledgment range (NACK range), where a value of NACK range is a quantity of RLC SDUs consecutively lost starting from an RLC SDU corresponding to NACK_SN. Specially, if the group of consecutive RLC SDUs are not received, and one RLC SDU segment immediately before and/or after the group of consecutive RLC SDUs is not received, SOstart and SOend are further included in addition to NACK_SN and NACK range.

Figure 2A:
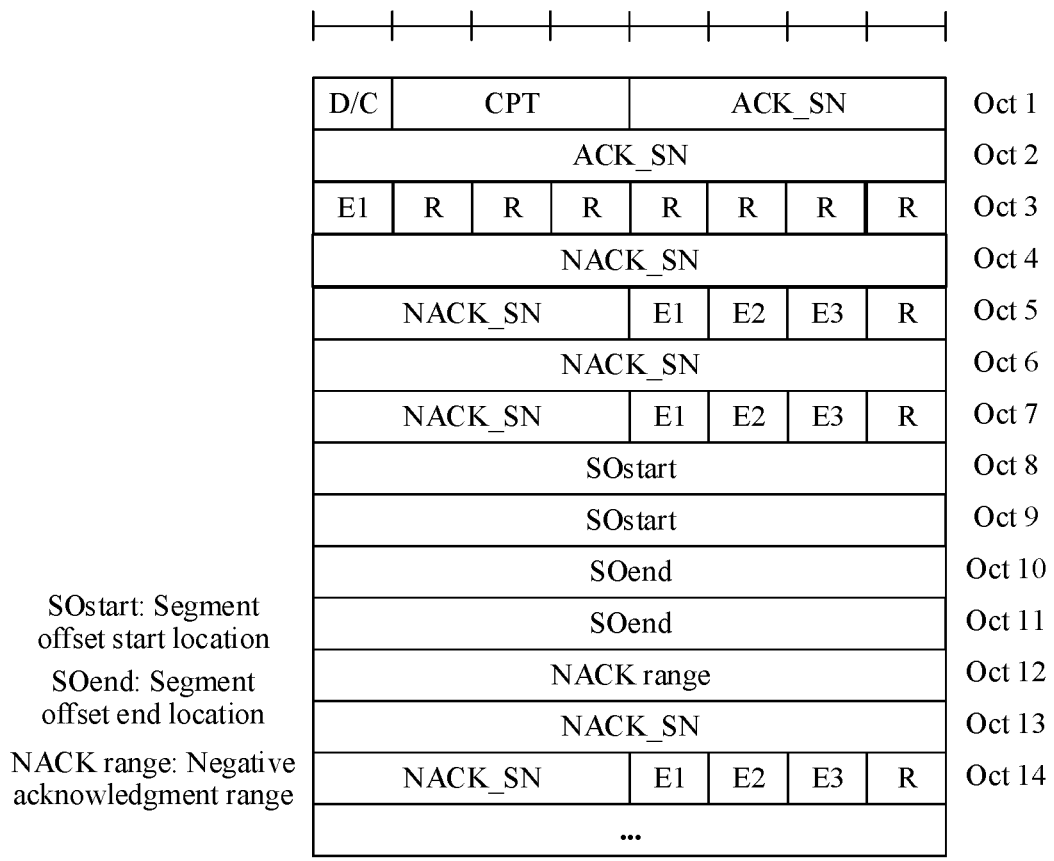

FIG. 2A is a schematic diagram of a format of an RLC status report. An example in which a length of NACK_SN in FIG. 2A is 12 bits is used. Explanations of fields are as follows:

D/C indicates a type of a PDU. Specifically, if a value of the field is 1, it indicates that the PDU is a data PDU. If the value of the field is 0, it indicates that the PDU is a control PDU.

CPT indicates a specific type of a control PDU. When CPT=0, it indicates that a current PDU is an RLC status PDU (namely, an RLC status report), that is, the current PDU is used to reflect a receiving status of data.

ACK_SN indicates an SN corresponding to a next RLC SDU that is not received and that is not indicated to be lost in a generated RLC status report.

E1 indicates whether a group of NACK_SN, E1, E2, and E3 follow subsequently. If a value of E1 is 0, it indicates that the group of NACK_SN, E1, E2 do not follow subsequently, and E3. If the value of E1 is 1, it indicates that the group of NACK_SN, E1, E2, and E3 follow subsequently.

E2 indicates that a group of SOstart and SOend follow subsequently. If a value of E2 is 0, it indicates that the group of SOstart and SOend do not follow subsequently. If the value of E2 is 1, it indicates that the group of SOstart and SOend follow subsequently.

E3 indicates whether there is subsequent information that consecutive RLC SDUs are not received. When a value of E3 is 0, it indicates that current NACK_SN is not followed by a NACK range field. When the value of E3 is 1, it indicates that current NACK_SN is followed by the NACK range field.

R is a reserved field.

In addition, for explanations of NACK_SN, SOstart, SOend, and NACK range, refer to the foregoing descriptions. Details are not described herein again.

The RLC status report indicates, by using information such as ACK_SN, NACK_SN, SOstart, SOend and NACK range, receiving statuses of RLC SDUs corresponding to all SNs before ACK_SN. To be specific, in data of the RLC SDUs corresponding to all the SNs before ACK_SN, data other than the following data is already successfully received: a lost RLC SDU and/or a lost RLC SDU segment indicated by NACK_SN, NACK_SN+SOstart+SOend, NACK_SN+NACK range, NACK_SN+SOstart+SOend+NACK range, and the like.

The following describes a format of the RLC status report by using a specific RLC status report.

As shown in FIG. 2B, the RLC status report includes a series of status information. An example in which a length of NACK_SN in FIG. 2B is 12 bits is used. ACK_SN=71, to be specific, the status report indicates that RLC SDUs whose SNs are 0 to 70 are successfully received, except the following RLC SDUs or RLC SDU segments:
- the RLC SDU whose SN is 1;
  - a segment part of the RLC SDU whose SN is 18 from an offset 1 to an offset 2;
  - the three consecutive RLC SDUs starting from the RLC SDU whose SN is 20, that is, the three RLC SDUs whose SNs are 20, 21, and 22; and
  - the three consecutive RLC SDUs and segments starting from the RLC SDU whose SN is 30, namely, a segment part of the RLC SDU whose SN is 30 from an offset 3 to an end location of the RLC SDU whose SN is 30, the entire RLC SDU whose SN is 31, and a segment part of the RLC SDU whose SN is 32 from a start location to a location of an offset 4 of the RLC SDU.

When filling in the RLC status report, an AM RLC entity on a receiving side sequentially indicates, in ascending order of SNs (sequence numbers), information about one or more RLC SDUs that are not successfully received until available space of the RLC status report is filled. Therefore, the following case exists: When filling information about the last RLC SDU that is not successfully received, the receiving side can fill only a part of information about the last RLC SDU that is not successfully received because the available space of the RLC status report is limited, and other remaining information cannot be filled in the RLC status report. However, the transmitting side does not know whether the information about the last RLC SDU that is not successfully received and that is indicated in the RLC status report is complete, and incorrectly considers that another data part that is of the RLC SDU corresponding to the last NACK_SN and that is not reflected in the RLC status report is already successfully received. The receiving side may clear, from a buffer, a data part that is considered to be successfully received. As a result, the data that is actually not successfully transmitted is lost.

Figure 3:
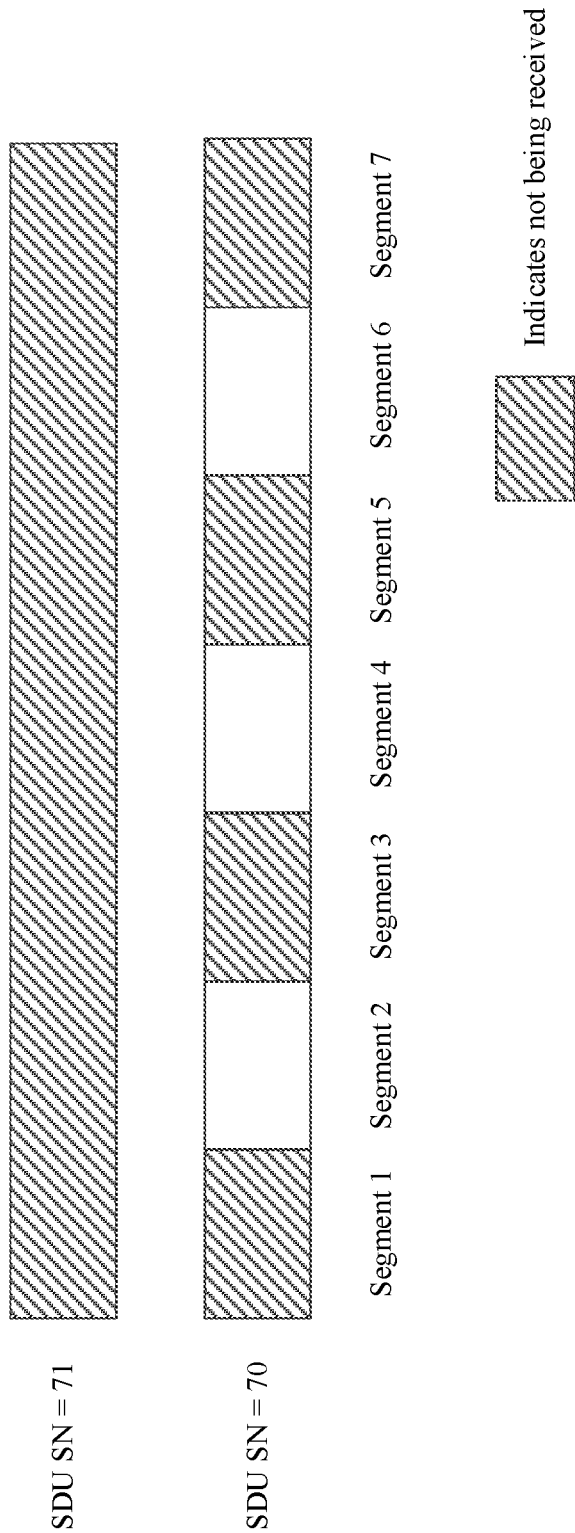
FIG. 3 is a schematic diagram of an SDU transmission scenario.

The following uses FIG. 3 as an example for description. An AM RLC entity on a receiving side sequentially indicates, in ascending order of SNs, information about RLC SDUs whose SNs are 0 to 69 and that are not successfully received. For an RLC SDU whose SN is 70, $2^{nd}$, $4^{th}$, and $6^{th}$ segments are received, $1^{st}$, $3^{rd}$, $5^{th}$, and $7^{th}$ segments are not received, and an RLC SDU whose SN is 71 is not received. Because available space of an RLC status report is limited, the AM RLC entity on the receiving side can indicate only information that the $1^{st}$ segment and the $3^{rd}$ segment in the RLC SDU whose SN is 70 are lost, and information that the $5^{th}$ segment and the $7^{th}$ segment are lost cannot be accommodated. According to a rule for filling in the RLC status report, ACK_SN is set to 71. In this case, after receiving the RLC status report, an AM RLC entity on a transmitting side incorrectly considers that the $5^{th}$ segment and the $7^{th}$ segment in the RLC SDU whose SN is 70 is already successfully received by the receiving side.

In conclusion, because a size of the RLC status report is limited, an RLC SDU corresponding to the last NACK_SN in the RLC status report may indicate only information that a part of segments are lost, and information that another part of segments are lost cannot be reflected in the status report. In this case, the RLC entity that receives the status report incorrectly considers, based on a value of ACK_SN and content in the status report, the another segment that is in the RLC SDU corresponding to the last NACK_SN and that is not reflected in the status report is successfully received. The RLC entity on the receiving side may clear, from a buffer, a data part that is considered to be successfully received. This causes a problem that data that is actually not successfully transmitted is lost.

To resolve the foregoing technical problem, embodiments of this application provide a plurality of RLC status report solutions. For example, a receiving side generates an RLC status report according to a principle of filling up available space of an RLC STATUS PDU. When an RLC SDU corresponding to the last NACK_SN may indicate only information that a part of segments are lost, the receiving side includes indication information in the RLC status report. The indication information indicates that a receiving status of a finally indicated RLC SDU in the RLC status report is not completely reflected in the RLC status report. Alternatively, the receiving side indicates, in the RLC status report, that the receiving status of the RLC SDU is that all RLC SDUs are not successfully received. Alternatively, the receiving side still generates the RLC STATUS PDU according to the principle of filling up the available space of the RLC status report. After receiving the RLC STATUS PDU, for the RLC SDU corresponding to the last NACK_SN, a transmitting side determines, based on an encapsulation manner used when the RLC SDU is previously sent, whether the receiving status of the RLC SDU is completely reflected in the RLC status report. The specific solutions will be described in detail later.

To make the objectives, technical solutions, and advantages of embodiments of this application clearer, the following further describes embodiments of this application in detail with reference to the accompanying drawings.

The technical solutions in embodiments of this application may be applied to various communication systems, for example, a 4th generation (4G) communication system, a 5th generation (5G) communication system, a 6th generation (6G) communication system, another future evolved system, or various other wireless communication systems using a radio access technology. The technical solutions in embodiments of this application may be used provided that there is a requirement for sending an RLC status report in the communication system.

Figure 4A:
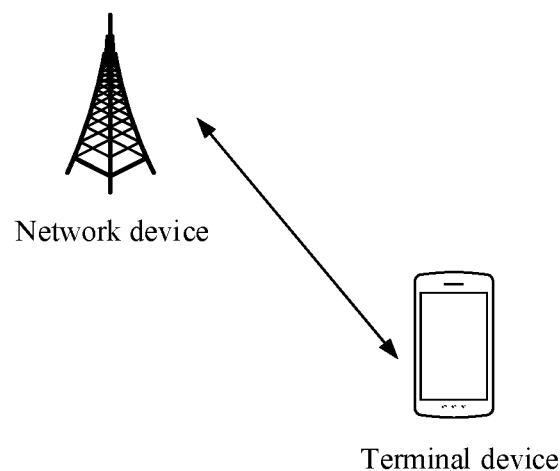
FIG. 4A is a possible schematic diagram of a structure of a communication system to which an embodiment of this application is applicable.

For example, FIG. 4A shows a possible communication system to which an embodiment of this application is applicable. The communication system includes a network device and a terminal device.

The terminal device includes a device that provides a user with a voice and/or data connectivity, for example, may include a handheld device having a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a device-to-device (D2D) communication terminal device, a V2X terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer having a mobile terminal device, or a portable, pocket-sized, handheld, or computer built-in mobile apparatus. For example, the terminal device may be a device such as a personal communications service (PCS) phone, a cordless telephone set, a session initiation protocol (SIP) phone, a wireless local loop (WLL) station, or a personal digital assistant (PDA). The terminal device may alternatively include a limited device, for example, a device having low power consumption, a device having a limited storage capability, or a device having a limited computing capability. For example, the terminal device includes an information sensing device such as a barcode, radio frequency identification (RFID), a sensor, a global positioning system (GPS), or a laser scanner.

By way of example, and not limitation, in embodiments of this application, the terminal device may alternatively be a wearable device. The wearable device may also be referred to as a wearable intelligent device, an intelligent wearable device, or the like, and is a generic term for wearable devices that are developed by applying wearable techniques to intelligent designs of daily wear, such as glasses, gloves, watches, clothes, and shoes. The wearable device is a portable device that can be directly worn on the body or integrated into clothes or an accessory of a user. The wearable device is not merely a hardware device. Moreover, the wearable device implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBUs).

The network side device includes, for example, an access network (AN) device and a radio access network (RAN) device, where the access network device, for example, a base station (for example, an access point), may be a device, in an access network, that communicates with a wireless terminal device over an air interface through one or more cells. The base station may be configured to mutually convert a received over-the-air frame and an internet protocol (IP) packet, and serve as a router between the terminal device and a remaining part of the access network. The remaining part of the access network may include an IP network. The network device may further coordinate attribute management of the air interface. For example, the network device may include an evolved NodeB (eNB, or e-NodeB, evolved NodeB) in a long term evolution (LTE) system or a long term evolution-advanced (LTE-A) system; may include a next generation NodeB (gNB), a next generation evolved NodeB (ng-eNB), or an enhanced next generation NodeB en-gNB in a 5th generation (5G) mobile communication technology new radio (NR) system; may include a central unit (CU) and a distributed unit (DU) in a cloud access network (cloud radio access network, Cloud RAN) system; or may further include a relay device. This is not limited in embodiments of this application.

In addition, in embodiments of this application, the network device may further include a core network device. The core network device includes, for example, a network device that processes and forwards signaling and data of a user. In a 4G system, a core network device is, for example, a mobility management entity (MME). The MME is a key control node of an access network of an LTE system defined in the 3rd generation partnership project (3GPP) protocol. The MME is responsible for a positioning and paging process and the like of a terminal device in an idle mode, where relaying is included. Briefly, the MME is a core network device responsible for signaling processing. Alternatively, in a 5G system, the core network device includes, for example, a core network device such as an access management network element, a session management network element, or a user plane gateway. The user plane gateway may be a server that has functions such as mobility management, routing, and forwarding specific to user plane data. The user plane gateway, for example, a serving gateway (SGW), a packet data network gateway (PGW), or a user plane network element functional entity (user plane function, UPF), is generally located on a network side.

In addition to communication between a network device and a terminal device, embodiments of this application may be further applied to communication between network devices and communication between terminal devices. This is not limited in embodiments of this application.

Figure 4B:
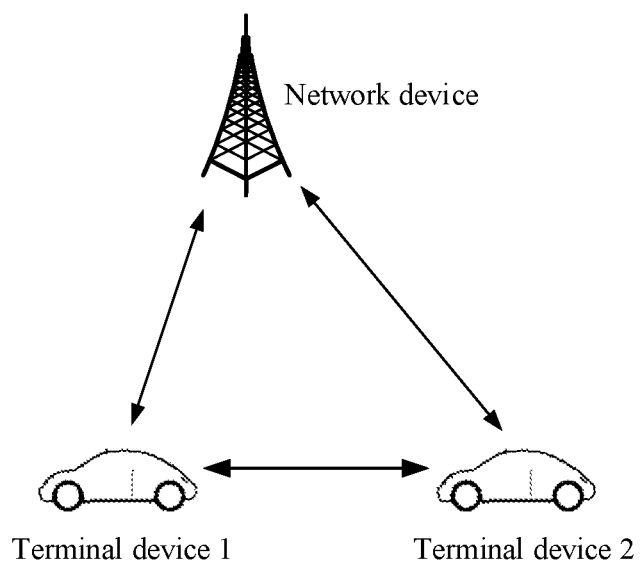
FIG. 4B is another possible schematic diagram of a structure of a communication system to which an embodiment of this application is applicable.

For example, FIG. 4B shows another possible communication system to which an embodiment of this application is applicable. The communication system includes a network device and a terminal device. There are a plurality of terminal devices, for example, a terminal device 1 and a terminal device 2. The terminal device 1 and the terminal device 2 may send data to each other based on a sidelink, and may further send an RLC status report indicating a receiving status.

It should be understood that FIG. 4A and FIG. 4B show merely several functions or devices in embodiments of this application, and a communication system architecture may further include more or fewer functions or devices. A communication system architecture to which embodiments of this application are applicable is not limited to that shown in FIG. 4A and FIG. 4B, and all communication system architectures that can implement functions of the devices shown in FIG. 4A and FIG. 4B are applicable to this application.

The terms "system" and "network" may be used interchangeably in embodiments of this application. "At least one" means one or more, and "a plurality of" means two or more. A term "and/or" describes an association relationship between associated objects and indicates that there may be three relationships. For example, A and/or B may represent the following three cases: Only A exists, both A and B exist, and only B exists, where A and B may be singular or plural. The character "/" generally represents an "or" relationship between the associated objects. At least one of the following items (pieces) or a similar expression thereof refers to any combination of these items, including any combination of singular items (pieces) or plural items (pieces). For example, at least one of a, b, or c may represent a, b, c, a and b, a and c, b and c, or a, b, and c.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first priority criterion and a second priority criterion are merely used to distinguish between different criteria, but do not indicate different content, priorities, importance, or the like of the two criteria.

In addition, the terms "include/comprise" and "have" in embodiments, claims, and accompanying drawings of this application are not exclusive. For example, a process, a method, a system, a product, or a device including a series of steps or modules is not limited to the listed steps or modules, and may further include steps or modules that are not listed.

Figure 5:
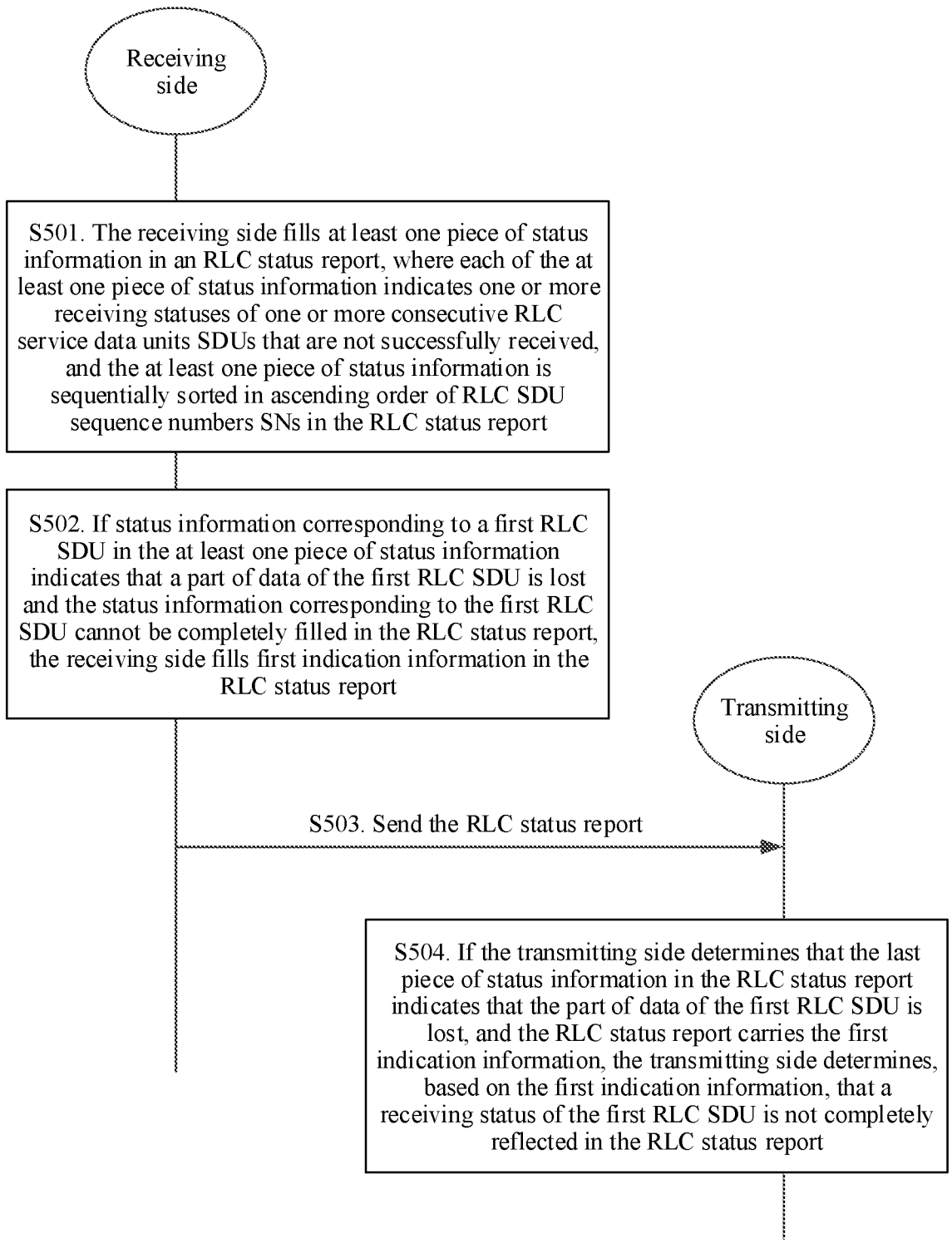
FIG. 5 is a flowchart of an RLC status report method according to an embodiment of this application.

FIG. 5 shows an RLC status report method according to an embodiment of this application. In the following description process, an example in which the method is applied to the application scenario shown in FIG. 4A or FIG. 4B is used.

S501. A receiving side fills at least one piece of status information in an RLC status report.

The receiving side refers to a device that receives data. After receiving data from a transmitting side, the receiving side fills in the RLC status report based on a receiving status and sends the RLC status report to the transmitting side, to feed back the receiving status of the data to the transmitting side. The transmitting side refers to a device that sends the data. The transmitting side may be the network device in FIG. 4A or FIG. 4B, or may be the terminal device in FIG. 4A or FIG. 4B. This is not limited herein. The receiving side may be the network device in FIG. 4A or FIG. 4B, or may be the terminal device in FIG. 4A or FIG. 4B. This is not limited herein.

Each of the at least one piece of status information indicates one or more receiving statuses of one or more consecutive RLC SDUs that are not successfully received. When filling in the RLC status report, the receiving side sequentially fills, in ascending order of SNs, status information of the RLC SDUs that are not successfully received, until available space of the RLC status report is filled.

1. When the status information indicates the receiving status of the RLC SDU that is not successfully received, the status information includes the following two types:

(1) The status information includes NACK_SN. It indicates that all data of an RLC SDU whose SN is NACK_SN is not successfully received by the receiving side.

(2) The status information includes NACK_SN, SOstart, and SOend. It indicates that a segment from an SOstart location to an SOend location in an RLC SDU whose SN is NACK_SN is not successfully received by the receiving side. SOstart is a relative location of the $1^{st}$ byte of the segment in the RLC SDU, and SOend is a relative location of the last byte of the segment in the RLC SDU. It should be understood that if N segments in one RLC SDU are not successfully received, there are N corresponding groups of NACK_SN+SOstart+SOend.

2. When the status information indicates the receiving status of the plurality of consecutive RLC SDUs that are not successfully received, the status information includes the following two types:

(1) The status information includes NACK_SN and NACK range. It indicates that starting from an RLC SDU corresponding to NACK_SN, consecutive RLC SDUs whose quantity is NACK range are not successfully received by the receiving side.

(2) The status information includes NACK_SN, NACK range, SOstart, and SOend. Relative locations of SOstart, SOend, and NACK range are shown in FIG. 2A. It indicates that starting from an RLC SDU corresponding to NACK_SN, consecutive RLC SDUs whose quantity is NACK range are not successfully received by the receiving side; and a segment part of the $1^{st}$ RLC SDU from SOstart to an end location in the consecutive RLC SDUs whose quantity is NACK range is not successfully received, and/or a segment part of the last RLC SDU from a start location to SOend is not successfully received.

S502. If status information corresponding to a first RLC SDU in the at least one piece of status information indicates that a part of data of the first RLC SDU is lost and the status information corresponding to the first RLC SDU cannot be completely filled in the RLC status report, the receiving side fills first indication information in the RLC status report.

When filling in the RLC status report, the receiving side sequentially fills, in ascending order of the SNs, the status information of the RLC SDUs that are not successfully received, until the available space of the RLC status report is filled. Therefore, when filling the status information of the last RLC SDU (the first RLC SDU) that is not successfully received, because the available space of the RLC status report is limited, the receiving side cannot completely fill, in the RLC status report, the status information corresponding to the first RLC SDU. In this case, the receiving side fills the first indication information in the status report, to indicate that a receiving status of the first RLC SDU is not completely reflected in the RLC status report.

The last piece of status information in the RLC status report includes the following two cases:

The first case includes a group of NACK_SN+SOstart+SOend. In this case, the last piece of status information in the RLC status report is the status information corresponding to the first RLC SDU.

For example, it is assumed that in RLC SDUs whose SNs are 0 to 70, only data of the RLC SDUs whose SNs are 10, 20, and 70 is not successfully received, where all the data of the RLC SDUs whose SNs are 10 and 20 is lost (that is, all the data is not successfully received), and a segment of the data of the RLC SDU whose SN is 70 is lost (FIG. 3 is used as an example in which the RLC SDU whose SN is 70 has seven segments in total, and the receiving side receives only the $2^{nd}$, $4^{th}$, and $6^{th}$ segments, but does not receive the $1^{st}$, $3^{rd}$, $5^{th}$, and $7^{th}$ segments). The receiving side sequentially fills the following information in the RLC status report:

status information corresponding to the RLC SDU whose SN is 10: NACK_SN=10; and status information corresponding to the RLC SDU whose SN is 20: NACK_SN=20.

When status information corresponding to the RLC SDU whose SN is 70 is filled, only loss information corresponding to the $1^{st}$ and $3^{rd}$ segments in the RLC SDU whose SN is 70 can be filled in remaining available space in the RLC status report, and loss information corresponding to the $5^{th}$ and $7^{th}$ segments cannot be accommodated. In this case, the RLC SDU whose SN is 70 is the first RLC SDU, and the receiving side fills, in the status report, only the loss information corresponding to the $1^{st}$ and $3^{rd}$ segments in the RLC SDU whose SN is 70 (including: NACK_SN (with a value of 70) corresponding to the first RLC SDU+SOstart1 and SOend1 corresponding to the $1^{st}$ segment; and NACK_SN (with the value of 70) corresponding to the first RLC SDU+SOstart3 and SOend3 corresponding to the $3^{rd}$ segment). A value of an ACK_SN field is filled as 71, and the first indication information is filled in the status report, to indicate that a receiving status of the RLC SDU whose SN is 70 is not completely reflected in the RLC status report.

It should be understood that the foregoing example is merely an example rather than a limitation. A size of the available space of the RLC report is not limited in this embodiment of this application.

The second case includes a group of NACK_SN, NACK range, SOstart, and SOend. In this case, status information that finally needs to be filled in the RLC status report includes the status information corresponding to the first RLC SDU, but in addition to the status information corresponding to the first RLC SDU, there is status information corresponding to another RLC SDU.

For example, it is assumed that in RLC SDUs whose SNs are 0 to 70, only data of the RLC SDUs whose SNs are 10, 68, 69, and 70 is not successfully received, where all the data of the RLC SDUs whose SNs are 10, 68, and 69 is lost (that is, all the data is not successfully received), and a segment of the data of the RLC SDU whose SN is 70 is lost (where the RLC SDU whose SN is 70 has seven segments in total, and the receiving side receives only the $2^{nd}$, $4^{th}$, and $6^{th}$ segments, but does not receive the $1^{st}$, $3^{rd}$, $5^{th}$, and $7^{th}$ segments). The receiving side sequentially fills the following information in the RLC status report:

status information corresponding to the RLC SDU whose SN is 10: NACK_SN=10.

When status information corresponding to the RLC SDUs whose SNs are 68 to 70 is filled, because the available space of the RLC status report is limited, only NACK_SN=68, SOstartX and SOendY, and NACK range=3 can be filled, where SOstartX is a start location (with a value of 0) of the RLC SDU whose SN is 68, and SOstartY is an end location of the $1^{st}$ segment in the RLC SDU whose SN is 70. It can be learned that the lost $3^{rd}$, $5^{th}$, and $7^{th}$ segments in the RLC SDU whose SN is 70 cannot be reflected in the RLC SDU. In this case, the receiving side fills a value of an ACK_SN field as 71 in the RLC status report, and the receiving side fills the first indication information in the status report, to indicate that a receiving status of the RLC SDU whose SN is 70 is not completely reflected in the RLC status report.

It should be understood that the foregoing example is merely an example rather than a limitation. A size of the available space of the RLC report is not limited in this embodiment of this application.

Further, the first indication information is specifically a first field in the RLC status report. When a value of the first field is a first preset value, it indicates that the receiving status of the first RLC SDU is not completely reflected in the RLC status report. When the value of the first field is a second preset value or the value of the first field is null, it indicates that the receiving status of the first RLC SDU is already completely reflected in the RLC status report.

Optionally, the value of the first field may be a reserved field in the RLC status report.

Figure 6A:
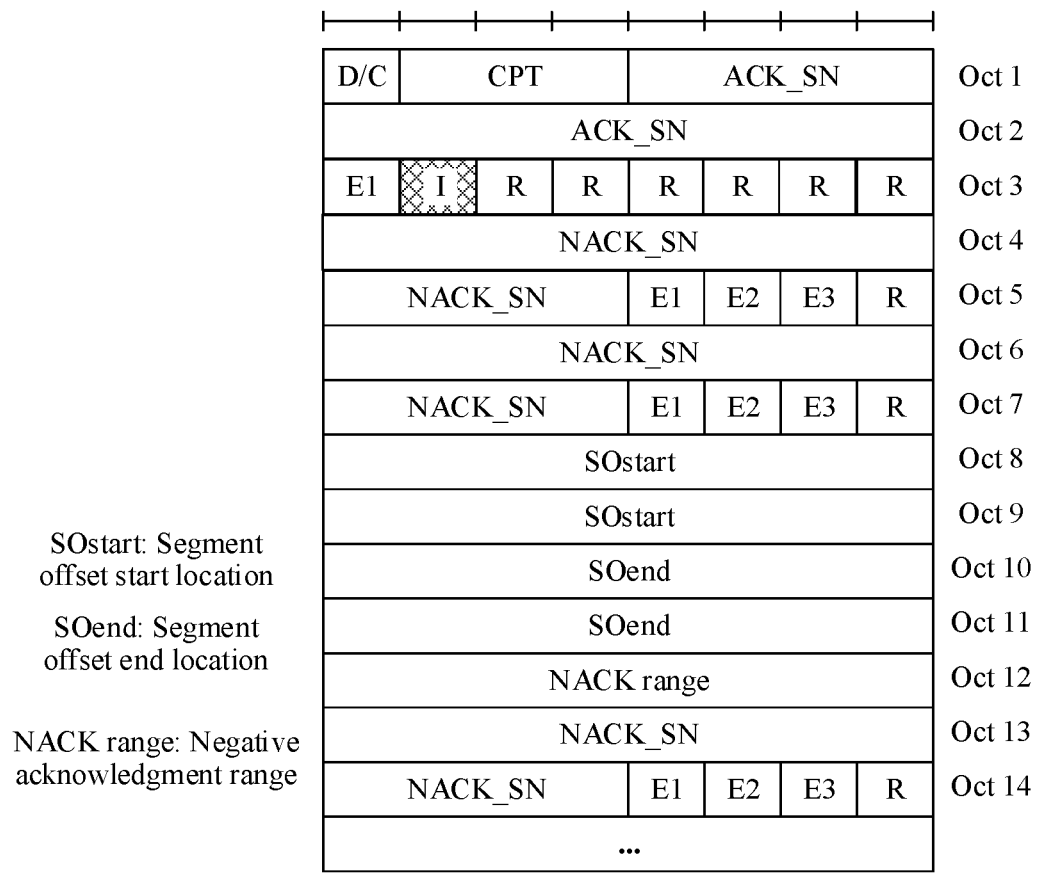
FIG. 6A and FIG. 6B each are a schematic diagram of a first field.

For example, as shown in FIG. 6A, I is used to represent the first field, and the $1^{st}$ reserved bit in a current RLC STATUS PDU is used as the first field I.

Figure 6B:
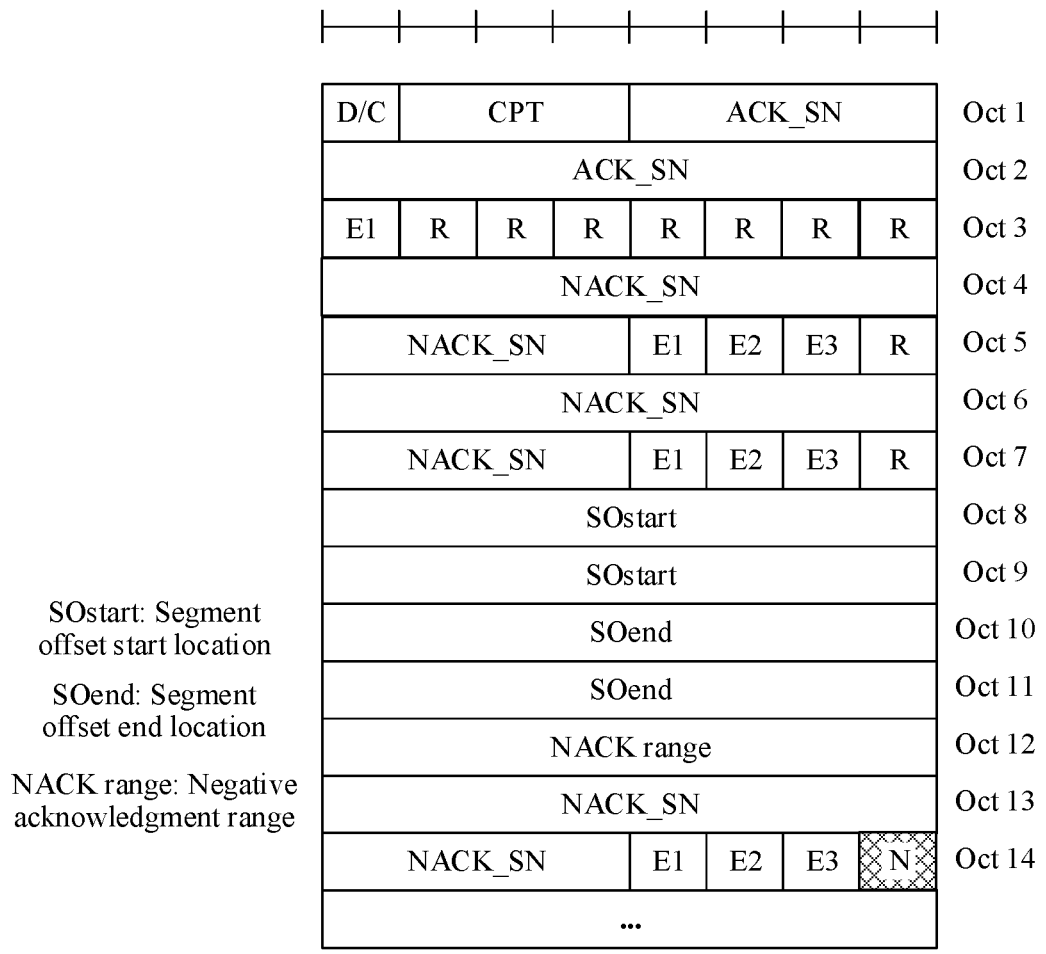

For example, as shown in FIG. 6B, N is used to represent the first field, and the last reserved bit in the current RLC STATUS PDU is used as the first field N.

Certainly, the foregoing is merely an example rather than a limitation, and there may be another implementation. For example, a plurality of reserved bits are used as the first field.

Optionally, when I=1, it indicates that the status information corresponding to the first RLC SDU is not completely reflected in the RLC status report; and when I=0, it indicates that status information corresponding to all RLC SDUs before ACK_SN is reflected in the current RLC STATUS PDU. Alternatively, when I=0, it indicates that the status information corresponding to the first RLC SDU is not completely reflected in the RLC status report; and when I=1, it indicates that status information corresponding to all RLC SDUs before ACK_SN is reflected in the current RLC STATUS PDU.

Optionally, the first field may reuse an existing field.

For example, the first field is a CPT field. The CPT field originally indicates a type of an RLC control PDU. When CPT=0, it indicates that a current control PDU is a STATUS PDU, and another value is a reserved value. Therefore, CPT may be set to a value other than 0 to represent the first indication information. For example, CPT=1 indicates that a current PDU is a STATUS PDU, but a data part that follows the last RLC SDU segment that is indicated to be lost is not reflected in the current RLC STATUS PDU.

S503. The receiving side sends the RLC status report to the transmitting side, and the transmitting side receives the RLC status report from the receiving side.

For a specific implementation of transmitting the RLC status report by the receiving side to the transmitting side, refer to a related technology. Details are not described herein.

S504. If the transmitting side determines that the last piece of status information in the RLC status report indicates that the part of data of the first RLC SDU is lost, and the RLC status report carries the first indication information, the transmitting side determines, based on the first indication information, that the receiving status of the first RLC SDU is not completely reflected in the RLC status report.

For example, the transmitting side learns, by using a value of the I field, a value of the N field, or a value of the CPT field in the RLC status report, that the receiving status of the first RLC SDU indicated by the last piece of status information in the RLC status report is not completely reflected in the RLC status report.

Further, if the last piece of status information finally indicates that an RLC SDU segment, for example, a first segment, in the first RLC SDU, is lost, the transmitting side may determine that a data part whose receiving status is not completely reflected in the RLC status report is a data part that is of the first RLC SDU and that follows the first segment.

For example, the last piece of status information in the RLC status report indicates loss information corresponding to the $3^{rd}$ segment in the RLC SDU whose SN is 70. However, it is found, based on a previous data transmission status, that the RLC SDU whose SN is 70 has seven segments in total. In this case, the transmitting side may consider that a receiving status of a data part that is the $4^{th}$, $5^{th}$, $6^{th}$, and $7^{th}$ segments in the RLC SDU whose SN is 70 is not completely reflected in the RLC status report.

Optionally, after determining, based on the first indication information, that the receiving status of the first RLC SDU is not completely reflected in the RLC status report, the transmitting side may further perform the following operation to further improve reliability of data transmission: retransmitting data that is of the first RLC SDU and whose receiving status is not reflected in the RLC status report; retransmitting all data of the first RLC SDU; storing, in a buffer, data that is of the first RLC SDU and whose receiving status is not reflected in the RLC status report, and after receiving another subsequent RLC status report, determining whether the part of data is successfully transmitted and a data part that needs to be retransmitted; or storing all data of the first RLC SDU in a buffer, and after receiving another subsequent RLC status report, determining whether the part of data is successfully transmitted and a data part that needs to be retransmitted.

The foregoing example is still used. It is assumed that the last piece of status information in the RLC status report indicates the loss information corresponding to the $3^{rd}$ segment in the RLC SDU whose SN is 70, and the RLC SDU whose SN is 70 has seven segments in total. The transmitting side may retransmit data of the $4^{th}$, $5^{th}$, $6^{th}$, and $7^{th}$ segments in the RLC SDU whose SN is 70, or retransmit all data of the first RLC SDU. Alternatively, the transmitting side stores, in a buffer, data of the $4^{th}$, $5^{th}$, $6^{th}$, and $7^{th}$ segments in the RLC SDU whose SN is 70, and after receiving another subsequent RLC status report, the transmitting side determines whether the part of data is successfully transmitted and a data part that needs to be retransmitted. Alternatively, the transmitting side stores all data of the first RLC SDU in a buffer, and after receiving another subsequent RLC status report, determines whether the part of data is successfully transmitted and a data part that needs to be retransmitted.

In an alternative manner of S504, the transmitting side determines, based on the first indication information carried in the RLC status report, that the receiving status of the first RLC SDU is not completely reflected in the RLC status report. In other words, after receiving the RLC status report, the transmitting side may not need to determine whether the last piece of status information in the RLC status report indicates that the part of data of the first RLC SDU is lost, but directly determine, based on the first indication information, that the receiving status of the first RLC SDU is not completely reflected in the RLC status report.

It can be learned from the foregoing that, in this embodiment of this application, when filling in the RLC status report, if the status information corresponding to the first RLC SDU cannot be completely filled in the RLC status report, the receiving side fills the first indication information in the RLC status report, so that the transmitting side can learn, by using the RLC status report, that the receiving status of the first RLC SDU is not completely reflected in the RLC status report, instead of incorrectly considering that all data that is of the first RLC SDU and that is not reflected in the status report is successfully received. This can improve reliability of the RLC status report, and avoid a problem that data that is actually not successfully transmitted is lost.

Figure 7:
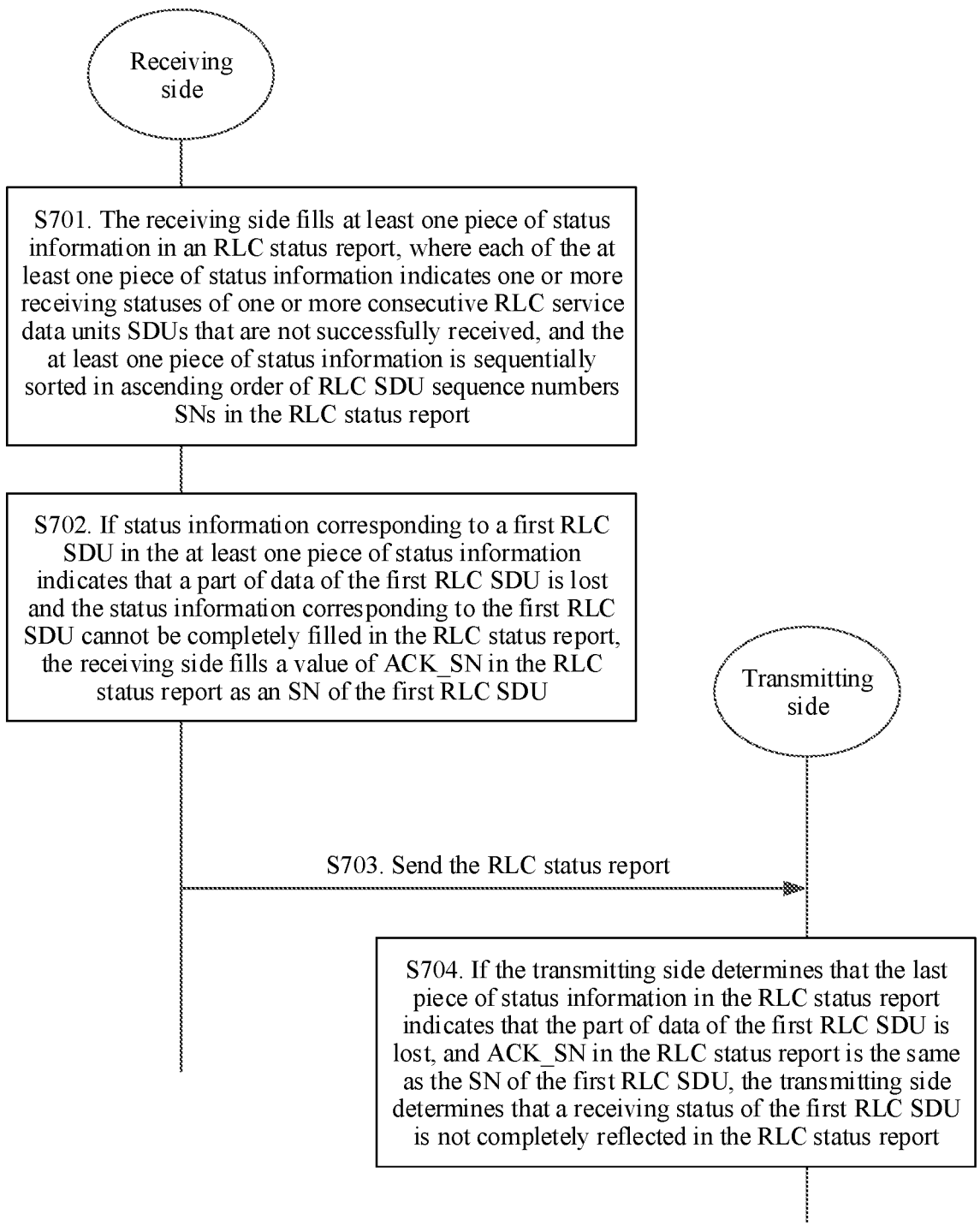
FIG. 7 is another flowchart of an RLC status report method according to an embodiment of this application.

As shown in FIG. 7, another embodiment of this application provides an RLC status report method. In the following description process, an example in which the method is applied to the application scenario shown in FIG. 4A or FIG. 4B is used.

S701. A receiving side fills at least one piece of status information in an RLC status report.

For a specific implementation of step S701, refer to the specific implementation of step S501 in the embodiment shown in FIG. 5. Details are not described herein again.

S702. If status information corresponding to a first RLC SDU in the at least one piece of status information indicates that a part of data of the first RLC SDU is lost and the status information corresponding to the first RLC SDU cannot be completely filled in the RLC status report, the receiving side fills a value of ACK_SN in the RLC status report as an SN of the first RLC SDU.

In this embodiment of this application, if the status information corresponding to the first RLC SDU in the at least one piece of status information indicates that the part of data of the first RLC SDU is lost and the status information corresponding to the first RLC SDU can be completely filled in the RLC status report, the value of ACK_SN is an SN corresponding to a next RLC SDU that is not received and that is not indicated to be lost in the generated RLC status report. However, if the status information corresponding to the first RLC SDU in the at least one piece of status information indicates that the part of data of the first RLC SDU is lost and the status information corresponding to the first RLC SDU cannot be completely filled in the RLC status report, the value of ACK_SN is the SN of the first RLC SDU.

FIG. 3 is still used as an example. The RLC status report indicates a data loss status of RLC SDUs whose SNs are 0 to 70. After sequentially filling, in ascending order of SNs, information about the RLC SDUs whose SNs are 0 to 69 and that are not successfully received, an AM RLC entity on the receiving side finds, when filling status information corresponding to the RLC SDU whose SN is 70, that there are seven segments in the RLC SDU whose SN is 70 in total, the $2^{nd}$, $4^{th}$, and $6^{th}$ segments are actually received, and the $1^{st}$, $3^{rd}$, $5^{th}$, and $7^{th}$ segments are not received. However, because available space of the RLC status report is limited, the AM RLC entity on the receiving side can indicate only information that the $1^{st}$ and $3^{rd}$ segments are lost, and information that the $5^{th}$ and $7^{th}$ segments are lost cannot be accommodated. In this case, according to the manner in this embodiment, the receiving side fills, in the RLC status report, only the information that the $1^{st}$ and $3^{rd}$ segments in the RLC SDU whose SN is 70 are lost, and sets the value of ACK_SN in the RLC status report to 70. In this way, ACK_SN in the RLC status report is set to be the same as the SN of the first RLC SDU, to implicitly indicate that a receiving status of the first RLC SDU is not completely reflected in the RLC status report.

S703. The receiving side sends the RLC status report to a transmitting side, and the transmitting side receives the RLC status report from the receiving side.

For a specific implementation of transmitting the RLC status report by the receiving side to the transmitting side, refer to a related technology. Details are not described herein.

S704. If the transmitting side determines that the last piece of status information in the RLC status report indicates that the part of data of the first RLC SDU is lost, and ACK_SN in the RLC status report is the same as the SN of the first RLC SDU, the transmitting side determines that the receiving status of the first RLC SDU is not completely reflected in the RLC status report.

The example in step S502 is still used. If the transmitting side determines that the RLC status report indicates the data loss status of the RLC SDUs whose SNs are 0 to 70, and the RLC status report finally indicates the information that the $3^{rd}$ segment in the RLC SDU whose SN is 70 is lost, the transmitting side may determine that the receiving status of the first RLC SDU is not completely reflected in the RLC status report. Further, the transmitting side may further determine, based on a previous data transmission status, that the RLC SDU whose SN is 70 originally has seven segments in total. In this case, the transmitting side may consider that a data part whose receiving status is not completely reflected in the RLC status report is the $4^{th}$, $5^{th}$, $6^{th}$, and $7^{th}$ segments in the RLC SDU whose SN is 70.

In an alternative manner of S704, the transmitting side may determine, based on information that ACK_SN in the RLC status report is the same as the SN of the first RLC SDU, that the receiving status of the first RLC SDU is not completely reflected in the RLC status report. In other words, after receiving the RLC status report, the transmitting side may not need to determine whether the last piece of status information in the RLC status report indicates that the part of data of the first RLC SDU is lost, but directly determine, based on the information that ACK_SN in the RLC status report is the same as the SN of the first RLC SDU, that the receiving status of the first RLC SDU is not completely reflected in the RLC status report.

For an operation (for example, retransmission or buffering) performed by the transmitting side after the transmitting side determines that the receiving status of the first RLC SDU is not completely reflected in the RLC status report, refer to related descriptions in the embodiment shown in FIG. 5. Details are not described herein again.

It can be learned from the foregoing that, in this embodiment of this application, when filling in the RLC status report, if the status information corresponding to the first RLC SDU cannot be completely filled in the RLC status report, the receiving side fills the value of ACK_SN in the RLC status report as the SN of the first RLC SDU, so that the transmitting side can learn, by using the RLC status report, that the receiving status of the first RLC SDU is not completely reflected in the RLC status report, instead of incorrectly considering that all data that is of the first RLC SDU and that is not reflected in the status report is successfully received. This can improve reliability of the RLC status report, and avoid a problem that data that is actually not successfully transmitted is lost.

Figure 8:
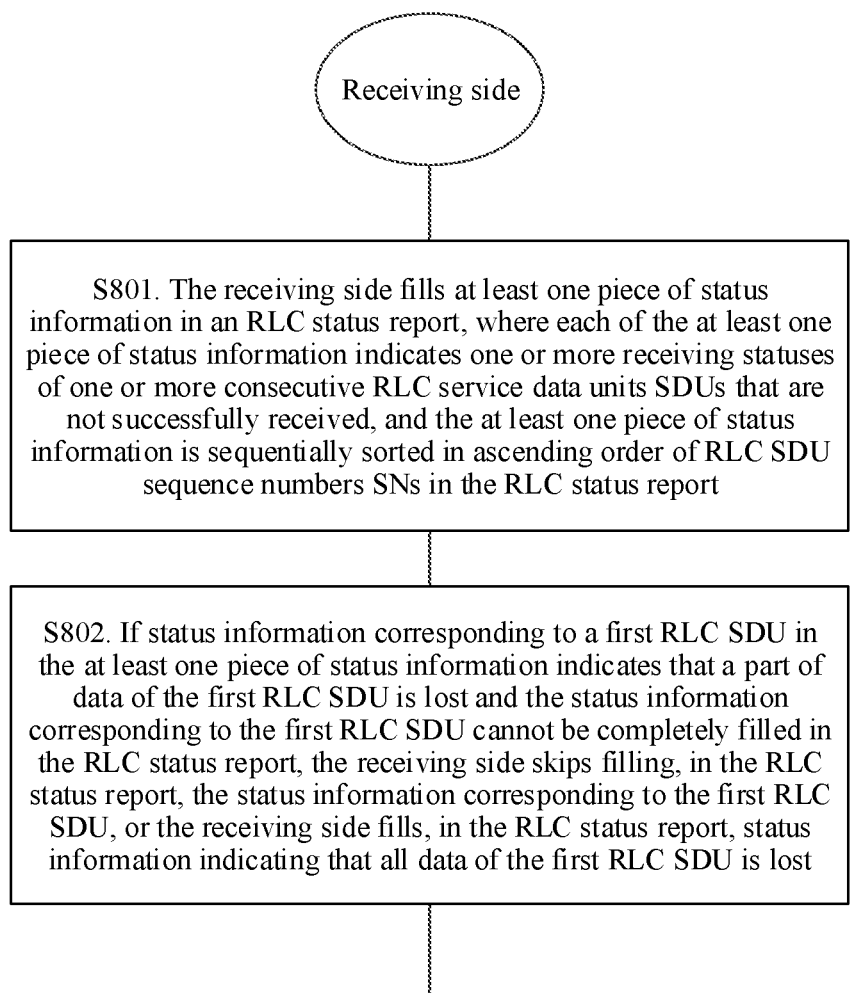
FIG. 8 is another flowchart of an RLC status report method according to an embodiment of this application.

As shown in FIG. 8, another embodiment of this application provides an RLC status report method. In the following description process, an example in which the method is applied to the application scenario shown in FIG. 4A or FIG. 4B is used.

S801. A receiving side fills at least one piece of status information in an RLC status report.

For a specific implementation of step S801, refer to the specific implementation of step S501 in the embodiment shown in FIG. 5. Details are not described herein again.

S802. If status information corresponding to a first RLC SDU in the at least one piece of status information indicates that a part of data of the first RLC SDU is lost and the status information corresponding to the first RLC SDU cannot be completely filled in the RLC status report, the receiving side skips filling, in the RLC status report, the status information corresponding to the first RLC SDU. Alternatively, the receiving side fills, in the RLC status report, status information indicating that all data of the first RLC SDU is lost. Alternatively, the receiving side sets the last SOend field in the RLC status report to an end location of the first RLC SDU.

The following separately describes the three cases.

(1) The receiving side does not fill the status information corresponding to the first RLC SDU in the RLC status report.

FIG. 3 is still used as an example. When generating the RLC status report, the receiving side sets ACK_SN to 70, and the RLC status report does not include information that any segment in an RLC SDU whose SN is 70 is lost.

In this manner, the status information corresponding to the first RLC SDU can be indicated in a subsequent RLC status report, to ensure that status information that corresponds to each RLC SDU that is indicated in each RLC status report is complete.

(2) The receiving side indicates, in the RLC status report, that all the data of the first RLC SDU is not received, and further indicates a receiving status of a subsequent RLC SDU, until available space of the RLC status report is filled.

FIG. 3 is still used as an example. The receiving side directly indicates, in the RLC status report, that all data of an RLC SDU whose SN is 70 is not received. In this case, only NACK_SN corresponding to the RLC SDU needs to be filled as 70, and the receiving status of the subsequent RLC SDU needs to be further indicated, until the available space of the RLC status report is filled. For example, in the finally generated RLC status report, the receiving side indicates that entire RLC SDUs corresponding to SNs that are 70 and 71 are not received, the $1^{st}$ segment in an RLC SDU corresponding to an SN that is 72 is not received, and ACK_SN is 73.

In this manner, a data part that is of each RLC SDU that is indicated in the RLC status report and that is not successfully received can be reflected, to ensure reliability of data transmission and space utilization of the RLC status report.

(3) The receiving side sets the last SOend field in the RLC status report to the end location of the first RLC SDU.

For example, an AM RLC entity on the receiving side sequentially indicates, in ascending order of SNs, information about RLC SDUs whose SNs are 0 to 69 and that are not successfully received. For an RLC SDU whose SN is 70, the $2^{nd}$, $4^{th}$, and $6^{th}$ segments are received, and the $1^{st}$, $3^{rd}$, $5^{th}$, and $7^{th}$ segments are not received. Because available space of the RLC status report is limited, the AM RLC entity on the receiving side can finally indicate, in the RLC status report, only information that the $3^{rd}$ segment in the RLC SDU whose SN is 70 is lost (where a relative location of the $3^{rd}$ segment in the original RLC SDU is the $A^{th}$ byte to the $B^{th}$ byte), and information that the $5^{th}$ and $7^{th}$ segments are lost cannot be accommodated. When filling in the RLC status report, the receiving side may fill the information that the $3^{rd}$ segment in the RLC SDU whose SN is 70 is lost as SOstart=A and SOend=all ones (namely, an end location of an RLC SDU corresponding to the RLC SDU whose SN is 70).

In this manner, a data part that is of each RLC SDU indicated in the RLC status report and that is not successfully received can also be reflected, to ensure reliability of data transmission and space utilization of the RLC status report.

For an operation performed by the transmitting side after the transmitting side receives the RLC status report, refer to related descriptions in the conventional technology. Details are not described herein.

It can be learned from the foregoing that, in this embodiment of this application, a manner of filling the status information by the receiving side is constrained, so that if an RLC SDU segment is finally indicated in the generated RLC status report, a data part that follows the segment is definitely successfully received. This can improve reliability of the RLC status report, and avoid a problem that data that is actually not successfully transmitted is lost.

In the embodiments shown in FIG. 5, FIG. 6A and FIG. 6B, FIG. 7, and FIG. 8, the receiving side fills in the RLC status report according to a preset policy, to resolve a problem that data that is actually not successfully transmitted is lost. To be specific, the receiving side fills the first indication information in the RLC status report (that is, the solution shown in FIG. 5), improves a rule for filling ACK_SN in the RLC status report (that is, the solution shown in FIG. 7), or constrains a manner of filling the status information by the receiving side (that is, the solution shown in FIG. 8).

In addition to the foregoing solutions, this application further provides an RLC status report solution. Different from the embodiments shown in FIG. 5, FIG. 6A and FIG. 6B, FIG. 7, and FIG. 8, a method for generating an RLC status report by a receiving side does not need to be improved, but whether a receiving status of a first RLC SDU is not completely reflected in the RLC status report is determined based on a sending status of the first RLC SDU.

Figure 9:
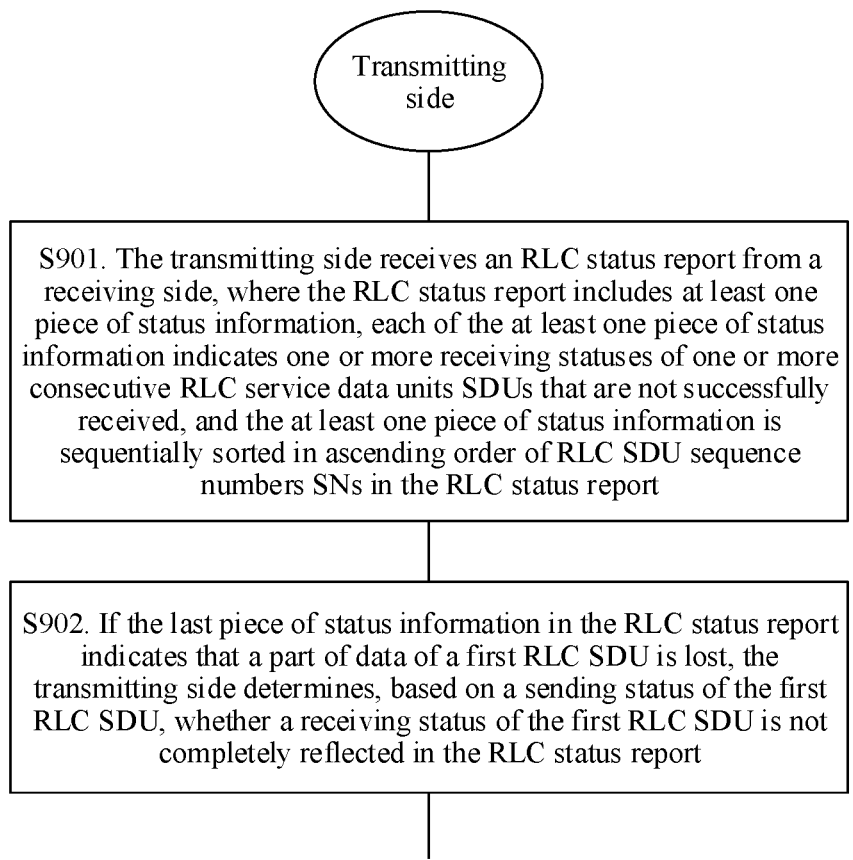
FIG. 9 is another flowchart of an RLC status report method according to an embodiment of this application.

As shown in FIG. 9, another embodiment of this application provides an RLC status report method. In the following description process, an example in which the method is applied to the application scenario shown in FIG. 4A or FIG. 4B is used.

S901. A transmitting side receives an RLC status report from a receiving side.

The RLC status report includes at least one piece of status information, each of the at least one piece of status information indicates one or more receiving statuses of one or more consecutive RLC service data units SDUs that are not successfully received, and the at least one piece of status information is sequentially sorted in ascending order of RLC SDU sequence numbers SNs in the RLC status report. For a format, a generation manner, a transmission manner, and the like of the RLC status report, refer to the related conventional technology. Details are not described herein.

S902. If the last piece of status information in the RLC status report indicates that a part of data of a first RLC SDU is lost, the transmitting side determines, based on a sending status of the first RLC SDU, whether a receiving status of the first RLC SDU is not completely reflected in the RLC status report.

Manner 1: If the last piece of status information in the RLC status report finally indicates that an RLC SDU segment in the first RLC SDU is lost, it is determined that the receiving status of the first RLC SDU is not completely reflected in the RLC status report.

To be specific, the transmitting side determines, based on a previous data transmission status, that when sending the first RLC SDU, the transmitting side segments the first RLC SDU (that is, encapsulates the first RLC SDU into a plurality of RLC PDUs) and then sends the first RLC SDU to the receiving side. In this case, the transmitting side considers whether the receiving status of the first RLC SDU is not completely reflected in the RLC status report.

For example, if the RLC status report finally indicates information that the $1^{st}$ segment in an RLC SDU whose SN is 70 is lost, the transmitting side determines that a receiving status of the RLC SDU whose SN is 70 is not completely reflected in the RLC status report, regardless of a specific quantity of segments in the RLC SDU whose SN is 70.

In this manner, a determining method is simple, efficiency is high, and reliability of data transmission can be ensured.

Manner 2: If the last piece of status information finally indicates that an RLC SDU segment (referred to as a first segment herein for ease of descriptions) in the first RLC SDU is lost, and data that is of the first RLC SDU and that follows the first segment is divided into at least two segments (that is, encapsulated into a plurality of RLC protocol data units PDUs) during transmission, the transmitting side determines that the receiving status of the first RLC SDU is not completely reflected in the RLC status report. More specifically, the transmitting side may consider that the $1^{st}$ segment that follows the first segment is successfully received, and a receiving status of another segment that follows the first segment is not reflected in the current RLC status report.

Manner 2 is described below by using an example with reference to FIG. 10A and FIG. 10B.

In the RLC status report received by the transmitting side, ACK_SN=71, and the $1^{st}$ segment in the RLC SDU whose SN is 70 is indicated to be lost, for example, NACK_SN=70, SOstart=0, and SOend=X.

Figure 10A:
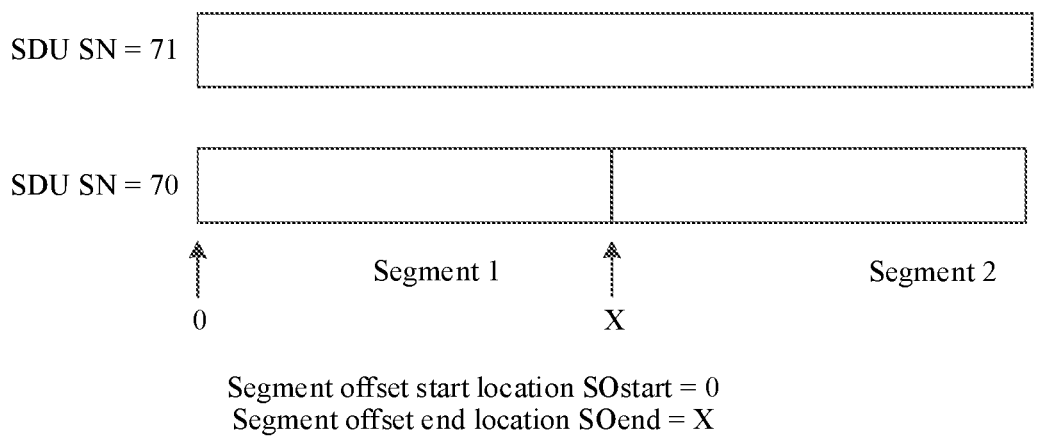
FIG. 10A and FIG. 10B each are a schematic diagram of a segmentation status of a first RLC SDU.

As shown in FIG. 10A, if an AM RLC entity on the transmitting side divides the RLC SDU whose SN is 70 into only two segments during transmission, the transmitting side may determine that the $2^{nd}$ segment is definitely successfully received. Otherwise, for the RLC SDU whose SN is 70, that all data of the RLC SDU whose SN is 70 is not successfully received should be indicated in the RLC status report. In this case, the transmitting side only needs to retransmit the $1^{st}$ segment, and does not need to retransmit the $2^{nd}$ segment.

Figure 10B:
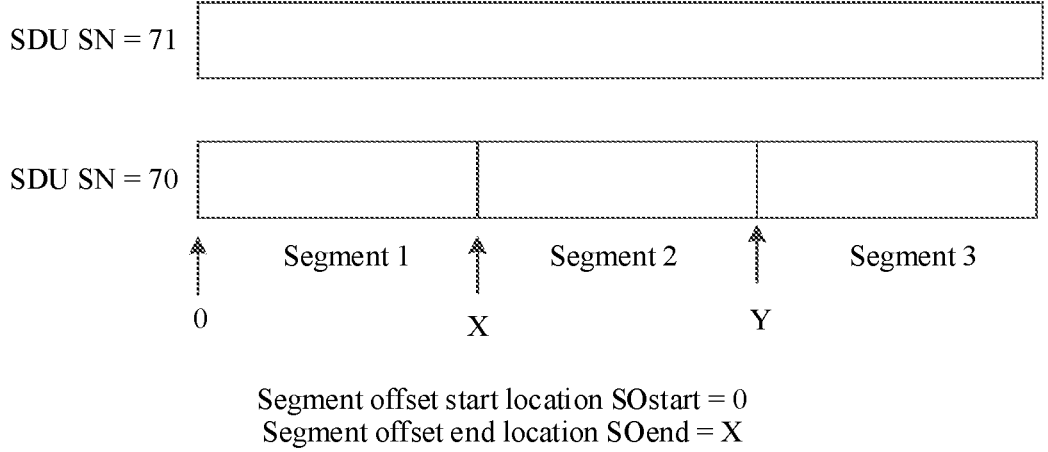

As shown in FIG. 10B, if the transmitting side divides the RLC SDU whose SN is 70 into three segments when sending the RLC SDU whose SN is 70, the transmitting side may determine that the $2^{nd}$ segment is definitely successfully received. Because if the $2^{nd}$ segment is not successfully received, SOend should be Y instead of X. For the $3^{rd}$ segment, the transmitting side cannot determine whether the $3^{rd}$ segment is successfully received. To ensure reliability of data transmission, the transmitting side considers that the $3^{rd}$ segment is not successfully received. In this case, the transmitting side needs to retransmit the $1^{st}$ segment, does not need to retransmit the $2^{nd}$ segment, and may retransmit the $3^{rd}$ segment, or may still store the $3^{rd}$ segment in a current RLC buffer. After receiving a subsequent RLC status report, the transmitting side determines whether retransmission needs to be performed.

This manner has high accuracy, and can ensure reliability of data transmission and reduce unnecessary data retransmission or buffering.

For an operation (for example, retransmission or buffering) performed by the transmitting side after the transmitting side determines that the receiving status of the first RLC SDU is not completely reflected in the RLC status report, refer to related descriptions in the embodiment shown in FIG. 5. Details are not described herein again.

It can be learned from the foregoing that, in this embodiment of this application, after the transmitting side receives the RLC status report, if the last piece of status information in the RLC status report indicates that the part of data of the first RLC SDU is lost, the transmitting side may determine, based on the sending status of the first RLC SDU, whether the receiving status of the first RLC SDU is not completely reflected in the RLC status report. This can avoid a problem that the transmitting side clears, from a buffer, a data part that is not successfully transmitted, to improve reliability of data transmission.

Another embodiment of this application further provides an RLC status report method. After receiving an RLC status report, for each RLC SDU indicated in the RLC status report, a transmitting side can clear or release the RLC SDU from an RLC buffer only when a complete receiving status of the RLC SDU is indicated in the RLC status report. To be specific, if any RLC SDU indicated in the RLC status report has information that a segment is lost, any data part of the RLC SDU cannot be cleared or released. In this way, a problem that data that is actually not successfully transmitted is lost can be avoided.

It should be understood that different embodiments in embodiments of this application may be combined with each other to achieve different technical effects. For example, the embodiment shown in FIG. 9 may be implemented in combination with the embodiment shown in FIG. 5. To be specific, the transmitting side may determine, based on the first indication information and the sending status of the first RLC SUD, whether the receiving status of the first RLC SUD is completely reflected in the RLC status report, to further improve determining accuracy. Alternatively, the embodiment shown in FIG. 9 may be implemented in combination with the embodiment shown in FIG. 7. To be specific, the transmitting side determines, based on the value of ACK_SN and the sending status of the first RLC SUD, whether the receiving status of the first RLC SUD is completely reflected in the RLC status report, to further improve determining accuracy. Certainly, there may be other combined implementation solutions, which are not listed one by one herein.

The foregoing describes the methods provided in embodiments of this application with reference to FIG. 5, FIG. 6A and FIG. 6B, FIG. 7 to FIG. 9, and FIG. 10A and FIG. 10B. The following describes apparatuses provided in embodiments of this application with reference to FIG. 11 to FIG. 13.

Based on a same technical concept, embodiments of this application further provide a communication apparatus 1100. The apparatus 1100 may be a network device, an apparatus on the network device, a terminal device, or an apparatus on the terminal device. The apparatus 1100 includes modules configured to perform the method performed by the receiving side in FIG. 5, FIG. 7, FIG. 8, or FIG. 9.

Figure 11:
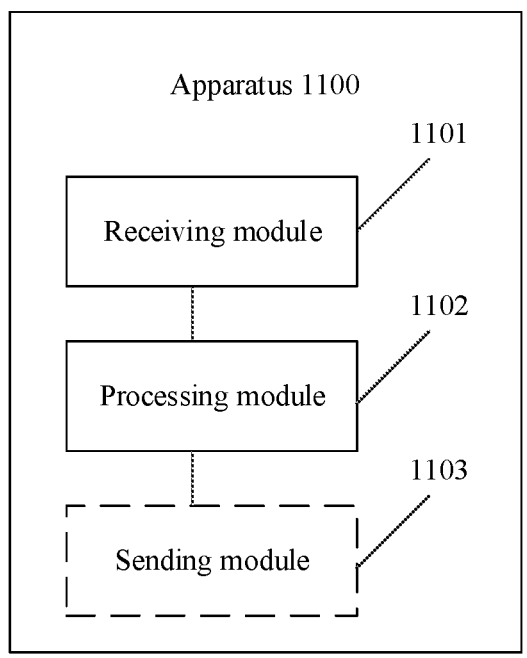
FIG. 11 is a schematic diagram of a structure of a communication apparatus 1100 according to an embodiment of this application.

For example, refer to FIG. 11. The apparatus 1100 may include:
- a receiving module 1101, configured to receive an RLC status report from a receiving side, where the RLC status report includes at least one piece of status information. Each of the at least one piece of status information indicates one or more receiving statuses of one or more consecutive RLC service data units SDUs that are not successfully received, and the at least one piece of status information is sequentially sorted in ascending order of RLC SDU sequence numbers SNs in the RLC status report; and
- a processing module 1102, configured to: if the last piece of status information in the RLC status report indicates that a part of data of a first RLC SDU is lost, determine, based on the RLC status report, whether a receiving status of the first RLC SDU is completely reflected in the RLC status report.

Optionally, the processing module 1102 is specifically configured to:
if the last piece of status information finally indicates that an RLC SDU segment in the first RLC SDU is lost, determine that the receiving status of the first RLC SDU is not completely reflected in the RLC status report.

Optionally, the RLC status report further includes first indication information, and the first indication information indicates whether the receiving status of the first RLC SDU is completely reflected in the RLC status report.

The processing module 1102 is specifically configured to determine, based on the first indication information, whether the receiving status of the first RLC SDU is completely reflected in the RLC status report.

Optionally, the processing module 1102 is specifically configured to: if acknowledgment_sequence number ACK_SN in the RLC status report is the same as an SN of the first RLC SDU, determine that the receiving status of the first RLC SDU is not completely reflected in the RLC status report.

Optionally, the processing module 1102 is specifically configured to: if the last piece of status information finally indicates that an RLC SDU segment in the first RLC SDU is lost, and data that is of the first RLC SDU and that follows the RLC SDU segment is encapsulated into a plurality of RLC protocol data units PDUs during transmission, determine that the receiving status of the first RLC SDU is not completely reflected in the RLC status report.

Optionally, if the receiving status of the first RLC SDU is not completely reflected in the RLC status report, the apparatus 1100 further includes:

- a sending module 1103, configured to retransmit data that is of the first RLC SDU and whose receiving status is not reflected in the RLC status report, or retransmit all data of the first RLC SDU; or
- a storage module, configured to store, in a buffer, data that is of the first RLC SDU and whose receiving status is not reflected in the RLC status report, or store all data of the first RLC SDU in a buffer.

A dashed box in FIG. 11 indicates that the sending module 1103 is optional for the apparatus 1100.

Based on a same technical concept, embodiments of this application further provide a communication apparatus 1200. The apparatus 1200 may be a network device, an apparatus on the network device, a terminal device, or an apparatus on the terminal device. The apparatus 1200 includes modules configured to perform the method performed by the transmitting side in FIG. 5, FIG. 7, FIG. 8, or FIG. 9.

Figure 12:
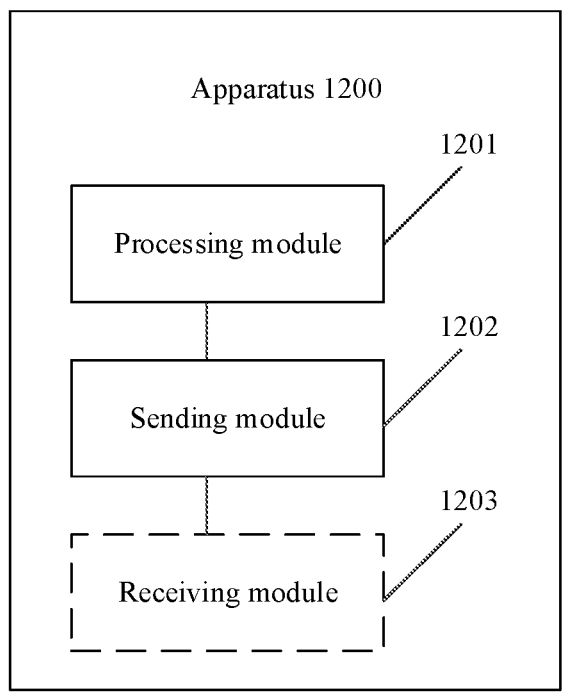
FIG. 12 is a schematic diagram of a structure of a communication apparatus 1200 according to an embodiment of this application.

For example, refer to FIG. 12. The apparatus 1200 may include:
- a processing module 1201, configured to fill at least one piece of status information in an RLC status report, where each of the at least one piece of status information indicates one or more receiving statuses of one or more consecutive RLC service data units SDUs that are not successfully received, and the at least one piece of status information is sequentially sorted in ascending order of RLC SDU sequence numbers SNs in the RLC status report; and
- a sending module 1202, configured to send the RLC status report to a transmitting side.

Optionally, the processing module 1201 is further configured to:
when status information corresponding to a first RLC SDU in the at least one piece of status information indicates that a part of data of the first RLC SDU is lost and the status information corresponding to the first RLC SDU cannot be completely filled in the RLC status report, skip filling, in the status report, the status information corresponding to the first RLC SDU, or fill, in the RLC status report, status information indicating that all data of the first RLC SDU is lost.

Optionally, the processing module 1201 is further configured to:
when status information corresponding to a first RLC SDU in the at least one piece of status information indicates that a part of data of the first RLC SDU is lost and the status information corresponding to the first RLC SDU cannot be completely filled in the RLC status report, fill first indication information in the RLC status report, where the first indication information indicates that a receiving status of the first RLC SDU is not completely reflected in the RLC status report.

Optionally, the processing module 1201 is further configured to:
when the status information corresponding to the first RLC SDU in the at least one piece of status information indicates that the part of data of the first RLC SDU is lost and the status information corresponding to the first RLC SDU cannot be completely filled in the RLC status report, set acknowledgment_sequence number ACK_SN in the RLC status report to an SN of the first RLC SDU.

Optionally, if the receiving status of the first RLC SDU is not completely reflected in the RLC status report, the apparatus 1200 further includes:

a receiving module 1203, configured to receive data that is of the first RLC SDU, that is retransmitted by the transmitting side, and whose receiving status is not reflected in the RLC status report, or configured to receive all data that is of the first RLC SDU and that is retransmitted by the transmitting side.

A dashed box in FIG. 12 indicates that the receiving module 1203 is optional for the apparatus 1200.

Figure 13:
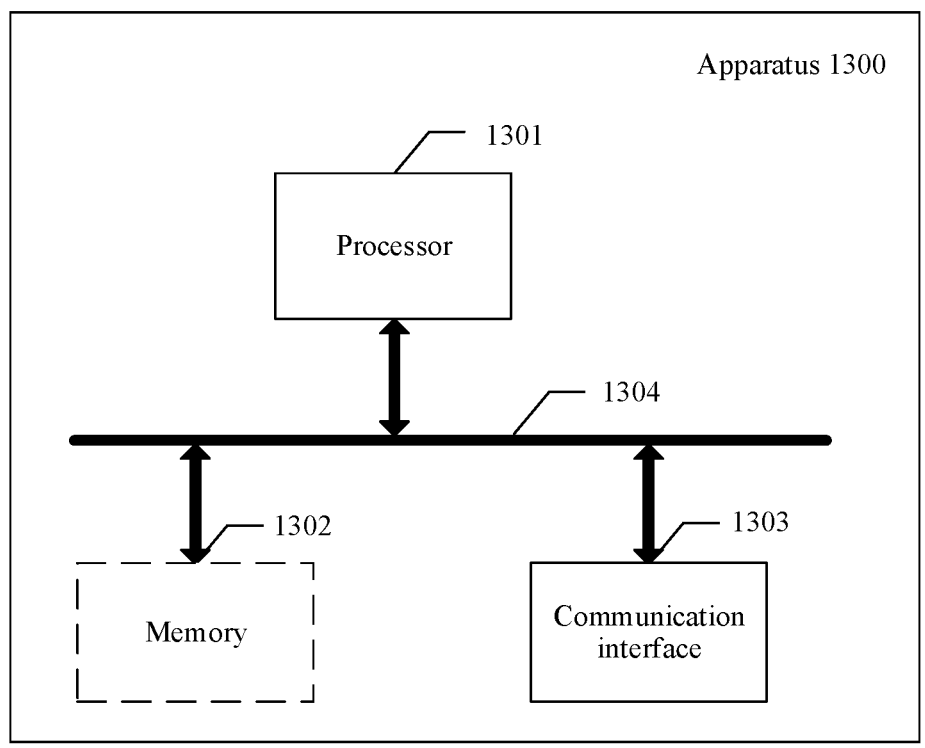
FIG. 13 is a schematic diagram of a structure of a communication apparatus 1300 according to an embodiment of this application.

Based on a same technical concept, embodiments of this application further provide a communication apparatus 1300. Referring to FIG. 13, the apparatus 1300 includes:

at least one processor 1301; and a communication interface 1303 that is communicatively connecting to the at least one processor 1301.

The at least one processor 1301 executes instructions stored in a memory 1302, so that the apparatus 1300 performs the method shown in FIG. 5, FIG. 7, FIG. 8, or FIG. 9.

Optionally, the memory 1302 is located outside the apparatus 1300.

Optionally, the apparatus 1300 includes the memory 1302. The memory 1302 is connected to the at least one processor 1301, and the memory 1302 stores the instructions that can be executed by the at least one processor 1301. In FIG. 13, a dashed line indicates that the memory 1302 is optional for the apparatus 1300.

The processor 1301 and the memory 1302 may be coupled by using an interface circuit, or may be integrated together. This is not limited herein.

A specific connection medium between the processor 1301, the memory 1302, and the communication interface 1303 is not limited in this embodiment of this application. In this embodiment of this application, in FIG. 13, the processor 1301, the memory 1302, and the communication interface 1303 are connected by using a bus 1304. The bus is represented by using a thick line in FIG. 13. A connection manner between other components is merely an example for description, and is not limited thereto. The bus may be classified into an address bus, a data bus, a control bus, and the like. For ease of representation, only one thick line is used to represent the bus in FIG. 13, but this does not mean that there is only one bus or only one type of bus.

It should be understood that the processor mentioned in embodiments of this application may be implemented by hardware or may be implemented by software. When the processor is implemented by using the hardware, the processor may be a logic circuit, an integrated circuit, or the like. When the processor is implemented by using the software, the processor may be a general-purpose processor, and is implemented by reading software code stored in the memory.

For example, the processor may be a central processing unit (CPU), or may be another general-purpose processor, a digital signal processor (DSP), an application-specific integrated circuit (ASIC), a field programmable gate array (FPGA), another programmable logic device, a discrete gate, a transistor logic device, a discrete hardware component, or the like. The general-purpose processor may be a microprocessor, or the processor may be any conventional processor, or the like.

It may be understood that the memory mentioned in embodiments of this application may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. By way of example, and not limitation, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA, another programmable logic device, a discrete gate, a transistor logic device, or a discrete hardware component, the memory (a storage module) may be integrated into the processor.

It should be noted that the memory described in this specification aims to include but is not limited to these memories and any memory of another proper type.

Based on a same technical concept, embodiments of this application further provide a communication apparatus, including a processor and an interface circuit. The interface circuit is configured to receive a signal from another communication apparatus different from the communication apparatus and transmit the signal to the processor, or send a signal from the processor to the another communication apparatus different from the communication apparatus. The processor is configured to implement the method in FIG. 5, FIG. 7, FIG. 8, or FIG. 9 by using a logic circuit or executing code instructions.

Based on a same technical concept, embodiments of this application further provide a computer-readable storage medium, including a program or instructions. When the program or the instructions is/are run on a computer, the method in FIG. 5, FIG. 7, FIG. 8, or FIG. 9 is performed.

Based on a same technical concept, embodiments of this application further provide a chip. The chip is coupled to a memory, and is configured to read and execute program instructions stored in the memory, to perform the method in FIG. 5, FIG. 7, FIG. 8, or FIG. 9.

Based on a same technical concept, embodiments of this application further provide a computer program product, including instructions. When the instructions are run on a computer, the method in FIG. 5, FIG. 7, FIG. 8, or FIG. 9 is performed.

Based on a same technical concept, embodiments of this application further provide a communication system, including the foregoing apparatus 1100 and the apparatus 1200.

All related content of the steps in the foregoing method embodiments may be cited in function descriptions of corresponding functional modules of the communication apparatus 1100, the communication apparatus 1200, and the communication apparatus 1300. Details are not described herein again.

The communication apparatus 1100, the communication apparatus 1200, and the communication apparatus 1300 provided in embodiments of this application may be configured to perform the methods provided in the corresponding embodiments in FIG. 5, FIG. 7, FIG. 8, and FIG. 9. Therefore, for technical effects that can be achieved by the communication apparatus 1100, the communication apparatus 1200, and the communication apparatus 1300, refer to the foregoing method embodiments. Details are not described herein again.

Embodiments of this application are described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

All or a part of the foregoing embodiments may be implemented through software, hardware, firmware, or any combination thereof. When the software is used to implement embodiments, all or a part of functions may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

Clearly, a person skilled in the art can make various modifications and variations to embodiments of this application without departing from the spirit and scope of this application. In this way, this application is intended to cover these modifications and variations in embodiments of this application provided that they fall within the scope of the claims of this application and their equivalent technologies.

What is claimed is:

1. A radio link control (RLC) status report method, comprising:
    receiving, by a transmitting side, an RLC status report from a receiving side, wherein the RLC status report comprises at least one piece of status information, each of the at least one piece of status information indicates one or more receiving statuses of one or more consecutive RLC service data units (SDUs) that are not successfully received, and the at least one piece of status information is sequentially sorted in ascending order of RLC SDU sequence numbers (SNs) in the RLC status report; and
    when a last piece of status information in the RLC status report indicates that a part of data of a last RLC SDU is lost, determining, by the transmitting side based on the RLC status report, whether a receiving status of the last RLC SDU is completely reflected in the RLC status report, wherein that the status information corresponding to the last RLC SDU cannot be completely filled in the RLC status report is indicated by a segment offset start location (SOstart) field in the RLC status report being set to a start location of a segment in the last RLC SDU and a segment offset end location (SOend) field in the RLC status report being set to an end location of the last RLC SDU.

2. The method according to claim 1, wherein the determining, by the transmitting side based on the RLC status report, whether a receiving status of the last RLC SDU is completely reflected in the RLC status report comprises:
    when the last piece of status information indicates that an RLC SDU segment in the last RLC SDU is lost, determining, by the transmitting side, that the receiving status of the last RLC SDU is not completely reflected in the RLC status report.

3. The method according to claim 1, wherein the RLC status report further comprises first indication information, and the first indication information indicates whether the receiving status of the last RLC SDU is completely reflected in the RLC status report; and
    the determining, by the transmitting side based on the RLC status report, whether a receiving status of the last RLC SDU is completely reflected in the RLC status report comprises:
        determining, by the transmitting side based on the first indication information, whether the receiving status of the last RLC SDU is completely reflected in the RLC status report.

4. The method according to claim 1, wherein the determining, by the transmitting side based on the RLC status report, whether a receiving status of the last RLC SDU is completely reflected in the RLC status report comprises:
    when acknowledgment_sequence number (ACK_SN) in the RLC status report is the same as an SN of the last RLC SDU, determining, by the transmitting side, that the receiving status of the last RLC SDU is not completely reflected in the RLC status report.

5. The method according to claim 1, wherein the determining, by the transmitting side based on the RLC status report, whether a receiving status of the last RLC SDU is completely reflected in the RLC status report comprises:
    when the last piece of status information indicates that an RLC SDU segment in the last RLC SDU is lost, and data that is of the last RLC SDU and that follows the RLC SDU segment is encapsulated into a plurality of RLC protocol data units (PDUs) during transmission, determining, by the transmitting side, that the receiving status of the last RLC SDU is not completely reflected in the RLC status report.

6. The method according to claim 1, wherein when the receiving status of the last RLC SDU is not completely reflected in the RLC status report, the method further comprises:
    retransmitting, by the transmitting side, at least one of:
        data that is of the last RLC SDU and whose receiving status is not reflected in the RLC status report, or all data of the last RLC SDU; or storing, by the transmitting side in a buffer, at least one of: data that is of the last RLC SDU and whose receiving status is not reflected in the RLC status report, or all data of the last RLC SDU in a buffer.

7. A radio link control (RLC) status report method, comprising:
filling, by a receiving side, at least one piece of status information in an RLC status report, wherein each of the at least one piece of status information indicates one or more receiving statuses of one or more consecutive RLC service data units (SDUs) that are not successfully received, and the at least one piece of status information is sequentially sorted in ascending order of RLC SDU sequence numbers (SNs) in the RLC status report;
when status information corresponding to a last RLC SDU in the at least one piece of status information indicates that a part of data of the last RLC SDU is lost and the status information corresponding to the last RLC SDU cannot be completely filled in the RLC status report, indicating a partial loss of the last RLC SDU by setting a segment offset start location (SOstart) in the RLC status report to a start location of a missing segment and a segment offset end location (SOend) field in the RLC status report to an end location of the last RLC SDU; and
sending, by the receiving side, the RLC status report to a transmitting side.

8. The method according to claim 7, wherein the method further comprises:
when status information corresponding to the last RLC SDU in the at least one piece of status information indicates that a part of data of the last RLC SDU is lost and the status information corresponding to the last RLC SDU cannot be completely filled in the RLC status report, skipping filling, by the receiving side in the RLC status report, the status information corresponding to the last RLC SDU, or filling, by the receiving side in the RLC status report, status information indicating that all data of the last RLC SDU is lost.

9. The method according to claim 8, wherein when the receiving status of the last RLC SDU is not completely reflected in the RLC status report, the method further comprises:
receiving, by the receiving side, data that is of the last RLC SDU, that is retransmitted by the transmitting side, and whose receiving status is not reflected in the RLC status report; or
receiving, by the receiving side, all data that is of the last RLC SDU and that is retransmitted by the transmitting side.

10. The method according to claim 7, wherein the method further comprises:
when status information corresponding to the last RLC SDU in the at least one piece of status information indicates that a part of data of the last RLC SDU is lost and the status information corresponding to the last RLC SDU cannot be completely filled in the RLC status report, filling, by the receiving side, first indication information in the RLC status report, wherein the first indication information indicates that a receiving status of the last RLC SDU is not completely reflected in the RLC status report.

11. The method according to claim 7, wherein the method further comprises:
when the status information corresponding to the last RLC SDU in the at least one piece of status information indicates that a part of data of the last RLC SDU is lost and the status information corresponding to the last RLC SDU cannot be completely filled in the RLC status report, setting acknowledgment_sequence number (ACK_SN) in the RLC status report to an SN of the last RLC SDU.

12. The method according to claim 7, wherein the setting the SOend field in the RLC status report to an end location of the last RLC SDU specifically comprises:
setting the last SOend field in the RLC status report to all ones.

13. A communication apparatus, comprising:
at least one processor; and
one or more memories coupled to the at least one processor and storing programming instructions for execution by the at least one processor to cause the apparatus to:
receive an RLC status report from a receiving side, wherein the RLC status report comprises at least one piece of status information, each of the at least one piece of status information indicates one or more receiving statuses of one or more consecutive RLC service data units (SDUs) that are not successfully received, and the at least one piece of status information is sequentially sorted in ascending order of RLC SDU sequence numbers (SNs) in the RLC status report; and
when a last piece of status information in the RLC status report indicates that a part of data of a last RLC SDU is lost, determine, based on the RLC status report, whether a receiving status of the last RLC SDU is completely reflected in the RLC status report, wherein that the status information corresponding to the last RLC SDU cannot be completely filled in the RLC status report is indicated by a segment offset start location (SOstart) field in the RLC status report being set to a start location of a segment in the last RLC SDU and a segment offset end location (SOend) field in the RLC status report being set to an end location of the last RLC SDU.

14. The apparatus according to claim 13, wherein the programming instructions, when executed by the at least one processor, cause the apparatus to:
when the last piece of status information indicates that an RLC SDU segment in the last RLC SDU is lost, determine that the receiving status of the last RLC SDU is not completely reflected in the RLC status report.

15. The apparatus according to claim 13, wherein the RLC status report further comprises first indication information, and the first indication information indicates whether the receiving status of the last RLC SDU is completely reflected in the RLC status report; and the programming instructions, when executed by the at least one processor, cause the apparatus to:
determine, based on the first indication information, whether the receiving status of the last RLC SDU is completely reflected in the RLC status report.

16. The apparatus according to claim 13, wherein the programming instructions, when executed by the at least one processor, cause the apparatus to: when acknowledgment_sequence number (ACK_SN) in the RLC status report is the same as an SN of the last RLC SDU, determine that the receiving status of the last RLC SDU is not completely reflected in the RLC status report.

17. The apparatus according to claim 13, wherein the programming instructions, when executed by the at least one processor, cause the apparatus to: when the last piece of status information indicates that an RLC SDU segment in the last RLC SDU is lost, and data that is of the last RLC SDU and that follows the RLC SDU segment is encapsulated into a plurality of RLC protocol data units (PDUs) during transmission, determine that the receiving status of the last RLC SDU is not completely reflected in the RLC status report.

18. The apparatus according to claim 13, wherein when the receiving status of the last RLC SDU is not completely reflected in the RLC status report, the programming instructions, when executed by the at least one processor, cause the apparatus to:
  retransmit at least one of data that is of the last RLC SDU and whose receiving status is not reflected in the RLC status report, or all data of the last RLC SDU; or
  store, in a buffer, at least one of data that is of the last RLC SDU and whose receiving status is not reflected in the RLC status report, or all data of the last RLC SDU in a buffer.

* * * * *